(12) United States Patent
Narayanan et al.

(10) Patent No.: US 9,369,285 B2
(45) Date of Patent: Jun. 14, 2016

(54) SOCIAL NETWORK BASED PKI AUTHENTICATION

(75) Inventors: Vidya Narayanan, San Diego, CA (US); Greg Rose, San Diego, CA (US); Lakshminath Reddy Dondeti, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 562 days.

(21) Appl. No.: 13/419,065

(22) Filed: Mar. 13, 2012

(65) Prior Publication Data

US 2012/0278625 A1    Nov. 1, 2012

Related U.S. Application Data

(60) Provisional application No. 61/480,270, filed on Apr. 28, 2011.

(51) Int. Cl.
  *H04L 29/06* (2006.01)
  *H04L 9/32* (2006.01)
  *H04L 9/00* (2006.01)

(52) U.S. Cl.
  CPC .............. *H04L 9/3247* (2013.01); *H04L 9/006* (2013.01); *H04L 29/06775* (2013.01); *H04L 63/0823* (2013.01)

(58) Field of Classification Search
  CPC ....... H04L 9/006; H04L 9/007; H04L 9/3249; H04L 9/3252; H04L 9/3255; H04L 9/3257; H04L 9/3263; H04L 9/3265; H04L 9/3268; H04L 9/3286; H04L 63/0823; H04L 9/00; H04L 9/30; H04L 9/32; G06F 21/31; G06F 21/33; G06F 21/45
  USPC ................................................. 713/157, 175
  See application file for complete search history.

(56) References Cited

U.S. PATENT DOCUMENTS 7,383,433 B2   6/2008  Yeager et al.
7,814,315 B2   10/2010 Parkinson
(Continued)

FOREIGN PATENT DOCUMENTS

CN   1604519 A    4/2005
EP   0998074 A2   5/2000
(Continued)

OTHER PUBLICATIONS

Pierre St. Juste, David Wolinsky, P. Oscar Boykin, Michael J. Covington, Renato J. Figueiredo, "SocialVPN: Enabling wide-area collaboration with integrated social and overlay networks", Computer Networks, 2010, pp. 1926-1938.*

(Continued)

*Primary Examiner* — Joseph P Hirl
*Assistant Examiner* — Chi Nguy
(74) *Attorney, Agent, or Firm* — Won Tae C. Kim

(57) ABSTRACT

A user device generates a social graph-based user certificate that conveys a trust level to other users of the social network. A user certificate for a user is obtained, the user having a user public key and corresponding user private key. A plurality of potential signers is identified within one or more social networks. The certificate is then sent to the identified plurality of potential signers. One or more signed versions of the user certificate may be received from at least some of the plurality of potential signers. The user device may assign a signer weight to each signed version of the user certificate, each corresponding signer weight associated with the signer of each signed version of the certificate. The user certificate, the user signature, one or more signed versions of the user certificate, and the user-assigned signer weights are distributed to one or more recipients.

38 Claims, 15 Drawing Sheets

(56) References Cited

U.S. PATENT DOCUMENTS

| | | |
|---|---|---|
| 2004/0088369 A1 | 5/2004 | Yeager et al. |
| 2004/0193872 A1* | 9/2004 | Saarepera et al. ............ 713/156 |
| 2005/0086300 A1* | 4/2005 | Yeager et al. ................. 709/204 |
| 2009/0064293 A1 | 3/2009 | Li et al. |
| 2009/0070582 A1* | 3/2009 | Aura et al. .................... 713/168 |
| 2010/0161817 A1* | 6/2010 | Xiao et al. .................... 709/229 |
| 2010/0205430 A1 | 8/2010 | Chiou et al. |
| 2011/0167257 A1 | 7/2011 | Gossel |

FOREIGN PATENT DOCUMENTS

| | | |
|---|---|---|
| EP | 1235135 A2 | 8/2002 |
| JP | 2000235340 A | 8/2000 |
| JP | 2001142397 A | 5/2001 |
| JP | 2002251136 A | 9/2002 |
| JP | 2005525731 A | 8/2005 |
| JP | 2008305188 A | 12/2008 |
| JP | 2010197980 A | 9/2010 |
| WO | WO-03088166 A2 | 10/2003 |
| WO | WO-2011038491 A1 | 4/2011 |

OTHER PUBLICATIONS

International Search Report and Written Opinion—PCT/US2012/035715—ISA/EPO—Aug. 28, 2012.

Zuo Y., et al., "Trust Computing for Social Networking", Sixth International Conference on Information Technology: New Generations (ITNG 2009), Apr. 27, 2009, pp. 1534-1539, IEEE, Piscataway, NJ, USA, XP031472485, ISBN: 978-1-4244-3770-2.

Ion, Mihaela, et al.; A Peer-to-Peer Multidimensional Trust Model for Digital Ecosystems; 2008 2nd IEEE Intl. Conference on Digital Ecosystems and Technologies, pp. 461-469.

Hitoshi H.,et al., "A Study on Visualization of Relevance of Linked Websites", Technical Report of the Institute of Image Information and Television Engineers, Japan, vol. 33, No. 11, Feb. 8, 2009, pp. 53-56.

* cited by examiner

SOCIAL NETWORK BASED PKI AUTHENTICATION

The present application for patent claims priority to U.S. Provisional Applications No. 61/480,270 entitled "Social Network Based PKI Authentication", filed Apr. 28, 2011, hereby expressly incorporated by reference herein.

BACKGROUND

1. Field

Various features pertain to a scalable mechanism that can leverage social networks or online communities for authentication and security.

2. Background

Current trends in privacy violations and poor management of user policies on social networks and online communities suggest a desperate need for an easier means to authenticate users, encrypt content, and/or grant/restrict access to such content. User-friendly means of constructing and sharing public keys have been designed—e.g., identity based encryption or the notion of using Uniform Resource Identifiers (URIs) as the public key. However, the ability to auto-generate a certificate (or a web of trust) does not currently exist. Without this, the public-private key pairs do not allow for authentication, authorization or non-repudiation. A Public Key Infrastructure (PKI) is a hierarchical means of accomplishing this—however, cost and scalability have prevented this from becoming the defacto mechanism. The notion of a "web of trust" solves this problem; however, this has traditionally required key-signing parties or the like.

As social networks expand, there are opportunities to leverage information therein for various purposes. It would be beneficial to provide a scalable mechanism that can leverage social networks or online communities for authentication and security.

SUMMARY

A first example provides a method operational on a user device for generating a social graph based certificate. A user certificate for a user of the user device is obtained, wherein the user is associated with a user public key and corresponding user private key. The user certificate may also include the user public key. A plurality of potential signers within one or more social networks is also identified. The user certificate is then sent from the user device to the plurality of potential signers. In response, the user device may receive one or more signed versions of the user certificate from at least some of the plurality of potential signers. A first signed version of the user certificate, from among the one or more signed versions of the user certificate, may be signed by a signer using a second private key and is authenticatable using a corresponding second public key.

The user certificate, the received one or more signed versions of the user certificate, and/or the identity of at least those signers of the received one or more signed versions of the user certificate may then be combined into a composite certificate. The user certificate, the user signature, one or more signed versions of the user certificate, and one or more user-assigned signer weights may be distributed to one or more recipients.

A user signature may also be generated by signing at least part of the composite certificate using the user private key. The user signature may be appended to the composite certificate.

Generating the user signature may include one of either: (a) signing the user certificate, including identities of the identified plurality of potential signers, using the user private key; and/or signing the user certificate, including the received one or more signed versions of the user certificate, using the user private key.

A signer weight may also be assigned to each signed version of the user certificate, each corresponding signer weight associated with the signer of each signed version of the user certificate, wherein the corresponding signer weights are also signed using the user private key to generate the user signature. In one example, the plurality of potential signers may be identified from contacts derived from emails or an address book for the user.

The identities of the identified plurality of potential signers, along with the user certificate, may also be sent from the user device to the plurality of potential signers for signing by one or more of the potential signers.

In some instances a user certificate timestamp or lifetime indicator may be appended to the user certificate at the user device prior to distribution to one or more recipients.

In one example, a user-assigned signer weight may be obtained for each signed version of the user certificate. The user-assigned signer weight for each signed version of the user certificate may be added to the composite certificate.

In one implementation, the user-assigned signer weight for each signer may be proportional to a trust relationship between the user and the signer. In a second example, the user-assigned signer weight for each signer may be proportional to a relationship distance between the user and the signer within a social network. In a third example, the user-assigned weight for each signer is at least one of: a time-varying weight or a purpose-dependent weight. In a fourth example, the user-assigned weight for each signer is at least partially based on weights received from other users and which are authenticable by the user device. In one instance, for signers known to the user of the user-assigned signer weight is solely determined by the user, while for signers unknown to the user the user-assigned signer weight is at least partially based on weights provided by known signers for such unknown signers.

In another implementation, a signer-specific weight for each signed version of the user certificate may be obtained. The signer-specific weight for each signed version of the user certificate may be added/appended to the composite certificate. In one example, each signer-specific weight is associated with a corresponding signer. In another example, each signer-specific weight may be generated by at least one of a community of users or a trusted third party.

In a second example, a method operational on a recipient device for generating a trust metric for a user is provided. A composite certificate may be received including a user certificate and one or more signed versions of the user certificate signed by one or more signers within a social network, and a user signature over the composite certificate. In one example, the user certificate may be a user public key.

The composite certificate and the one or more signed versions of the user certificate may be authenticated. A trust metric may be generated for the user based on the one or more signers upon successful authentication.

In one implementation, a signer weight may be received for each of the one or more signers as part of the composite certificate. The trust metric for the user may be generated based on the received signer weights for the one or more signers.

In another implementation, a recipient-assigned signer weight may be assigned to each of the one or more signed versions of the user certificate, each recipient-assigned signer weight corresponding to the signer of each of the signed versions of the user certificate.

In various instances, the trust metric may be generated based on: (a) a combination of the signer weights and recipient-assigned signer weights, or (b) one or more recipient-assigned signer weights.

Authenticating the user certificate may include applying a user public key to the user signature to verify the authenticity of the signed content within the composite certificate. Authenticating the one or more signed versions of the user certificate may include applying a signer public key to the one or more signed versions of the user certificate to verify their authenticity. In another implementation, the one or more signed versions of the user certificate may be signed by a party other than the user.

DETAILED DESCRIPTION

Figure 1:
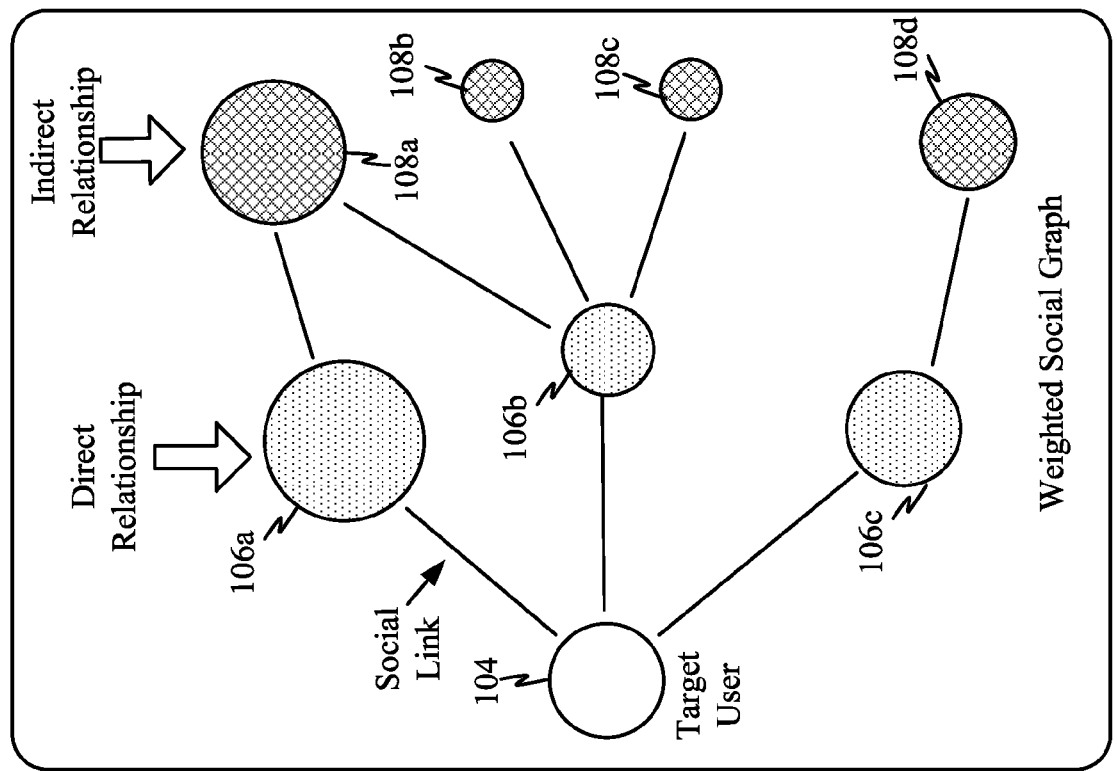
FIG. 1 is a diagram illustrating the concepts of unweighted and weighted social graphs for a social network.
Figure 1:
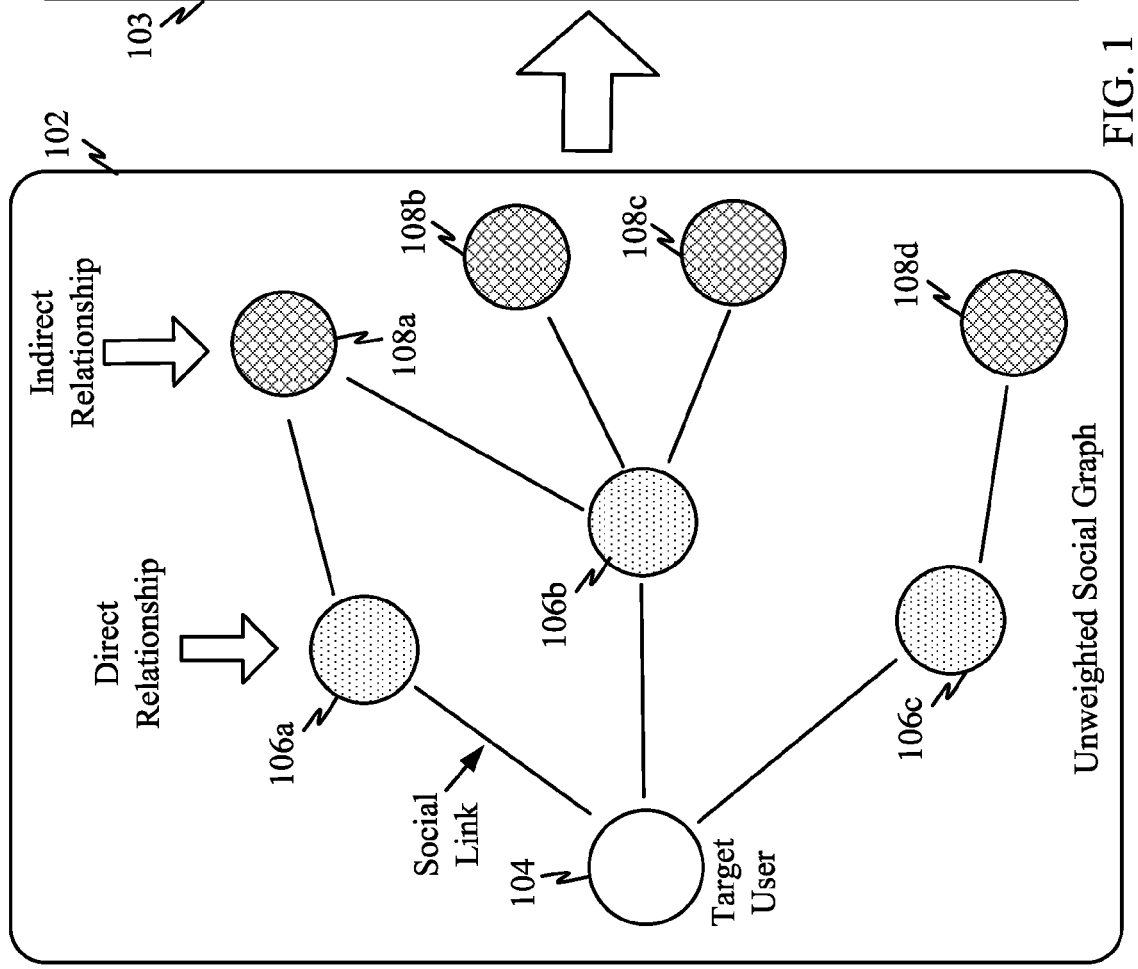

In the following description, specific details are given to provide a thorough understanding of the embodiments. However, it will be understood by one of ordinary skill in the art that the embodiments may be practiced without these specific detail. For example, circuits may be shown in block diagrams in order avoid obscuring the embodiments in unnecessary detail. In other instances, well-known circuits, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

In the world of social networks, networks of relationships (referred to as social graphs) may be established among various users or members of the social network. The information inherent in the relationships defined within these social networks may be used, for example, to establish different levels of trust among the users/members. In one example, a user's/member's extended social relationships may be employed to ascertain a certain level of trust for that user/member. Additionally, some or all of the extended social relationships for that user/member may be weighed to define a trust for that relationship. A trust level for the user/member may then be defined based on the weighted or unweighted relationships between the user/member and other users/members of the social network.

According to one feature, a certificate for a user/member may be generated that conveys a trust level to other users/members of a social network. In one example, a user device may generate a social graph-based (e.g., using social network relationships) user certificate. A user certificate for a user is obtained, the user having a user public key and corresponding user private key. A plurality of potential signers is identified within one or more social networks. The certificate is then sent to the identified plurality of potential signers. One or more signed versions of the user certificate may be received from at least some of the plurality of potential signers. The user device may assign a signer weight to each signed version of the user certificate, each corresponding signer weight associated with the signer of each signed version of the certificate. The one or more signed versions of the user certificate may be signed using the user private key to generate a user signature. The corresponding signer weights may also be signed using the user private key to generate a user signature. The user certificate, the user signature, one or more signed versions of the user certificate, and/or the user-assigned signer weights may be distributed to one or more recipients.

According to another feature, a recipient device may generate a trust metric for a user (or corresponding user device). The recipient device may obtain a user public key for a user (or associated user device). A user certificate and a user signature may be received including one or more signed versions of the user certificate signed by one or more signers within a social network. The user signature and the one or more signed versions of the user certificate may be authenticated by the recipient device. For instance, the user public key may be applied to the user signature to verify the authenticity of the signed content within the user signature. Additionally, authenticating the one or more signed versions of the user certificate may include applying the signer public key to the signed received certificates to verify the authenticity of the signed content within the signed received certificates.

Upon successful authentication, the recipient device may generate a trust metric for the user (or user device) based on the one or more signers. A signer weight may be received for each of the one or more signers, where the trust metric for the user is generated based on the received signer weights for the one or more signers. Alternatively, a recipient-assigned signer weight may be assigned to each of the one or more signed versions of the user certificate, each recipient-assigned signer weight corresponding to the signer of each of the signed versions of the user certificate. Thus, the trust metric may be generated based on a combination of the signer weights and recipient-assigned signer weights or just the one or more recipient-assigned signer weights.

Leveraging Social Networks/Online Communities to Generate Social Graphs

Information security is fast becoming important in the world of social sharing (e.g., within social networks and/or online communities). User-friendly means of constructing and sharing public keys have been designed (e.g., identity-based encryption or the notion of using Uniform Resource Identifiers (URIs) as the public key). However, the ability to auto-generate a certificate (or a web of trust) does not currently exist. Without this, the public-private key pairs do not allow for authentication, authorization, and/or non-repudiation. A Public Key Infrastructure (PM) is a hierarchical means of accomplishing auto-generation of a certificate within social networks or online communities. However, the cost of implementing PM and scalability issues has prevented PKI from becoming the de facto security mechanism within social networks and/or online communities. The notion of a "web of trust", implemented based on social network relationships and PM solves this problem. A means for bootstrapping key signing based on social graphs (e.g., relationships within social networks) can be extremely useful in making security accessible and usable on a global level (e.g., through a social network and beyond). Privacy sensitive or selective sharing of information is significantly simpler to solve in the presence of such a model that utilizes network relationships and PM.

The nature and structure of social networks and/or online communities includes inherent information, such as relationships, credentials for each user, etc., that may be helpful in implementing a security/authentication system. A "social graph" may be built from information available on social networks or online communities and serve to security (authentication, encryption, privacy).

FIG. 1 is a diagram illustrating the concepts of unweighted and weighted social graphs for a social network. An unweighted social graph 102 does not distinguish among varying grades or levels of relationships among users of the social networks. A target user 104 (e.g., person or target user device) may have different types of relationships with other users (e.g., persons or other user devices), including but not limited to direct relationships and indirect relationships. Direct relationships may include those relationships with others that the target user 104 knows directly while indirect relationship may include those relationships in which the target user 104 knows someone based on a relationship with another user. The level of trust or weight (i.e. varying grades or levels) of the relationship amongst user is illustrated here by the size of the node located on the graph. Each node may represent a different user. As can be seen in the unweighted social graph 102, users 106a, 106b, and 106c have a direct relationship with the target user 104. Similarly, in the unweighted social graph 102, users 108a, 108b, 108c, and 108d have an indirect relationship with the target user 104 The relationships from the target user 104 to all direct relationship users 106a, 106b, and 106c all indirect relationship users 108a, 108b, 108c, and 108d are equally weighted (i.e., unweighted).

One aspect provides an improvement to the unweighted social graph by using weighed relationships to generate a weighted social graph 103 which may capture social interactions of users more accurately. The weighted social graph 103 shows the same relationships the target user 104 has with direct relationship users 106a, 106b, and 106c and indirect relationship users 108a, 108b, 108c, and 108d. As can be seen in the weighted social graph 103, the size of the nodes for direct relationship users 106a, 106b, and 106c may be different than the size of the nodes for indirect relationship users 108a, 108b, 108c, and 108d. Specifically, some users may have larger nodes, indicating a greater weight (e.g., are more trustworthy, know the target user 104 better, etc.). For example, a first user 106a may have a greater weight (e.g., are more trustworthy, know the target user 104 better, etc.) than a second user 106b. In some cases, an indirect relationship third user 108a may even have a greater weight than a direct relationship fourth user 106c. That is, some users may be more trustworthy than others so, in one aspect, the larger the node on the weighted social graph 103 the more trustworthy the user.

According to one feature, the weight of an indirect relationship user may be affected by the weight assigned or attributed to the direct relationship user which links the indirect relationship user to the target user 104. For example, in the weighted social graph 103, a fifth indirect relationship user 108b may have a lower weight (relative to the target user 104) due to its link through the second user 106b, which has a lower weight as well. Similarly, the third user 108a may have a greater weight (relative to the target user 104) due to its link through the first user 106a, which has a greater weight as well. Consequently, the weights of certain users may be dependent on the weights of intermediate users.

According to another aspect, the weight assigned to each user may be independent of other users. For example, the weight assigned to the third user 108a may be independent of the weights assigned to the first user 106a and/or the second user 106b.

Using the weighted social graph 103, a "social" public key infrastructure (PKI)" can be constructed that can serve to authenticate users and/or secure access to information. Such social PM takes advantage of the growing social graph structures on the web and/or internet. Weighted social graphs make bootstrapping a PKI significantly simpler. The weights assigned to each user (e.g., contact or member of a social network or online community) may be influenced by a number of factors, including but not limited to, the circumstances of how the target user met the other user, how long the users have known each other and the history (or types of interactions) between the users. According to one aspect, weights assigned to users may change over time. The changing of the weights may be influenced by several factors including, but not limited to, increased interactions between two users, decreased trust and/or conditional trust between the users.

A combined authentication and/or trust certificate for the target user 104 may be generated based on the trust level of its direct and/or indirect relationships and the PKI for the target user and/or other users. Such authentication and/or trust certificates may be short lived (e.g., expire after a relatively short period of time or after a single transaction) or long lived (e.g., expire after days, weeks, months, or years) in addition to being conditional and/or unconditional. For example, a certificate may be conditional on whether a user (e.g., trusted user 104 or other user 106a-c and 108a-d) is only trusted with respect to a specific domain (e.g., a domain where such certificate may be used/trusted). Unconditional certificates may not be limited to any source and/or in time.

Figure 2:
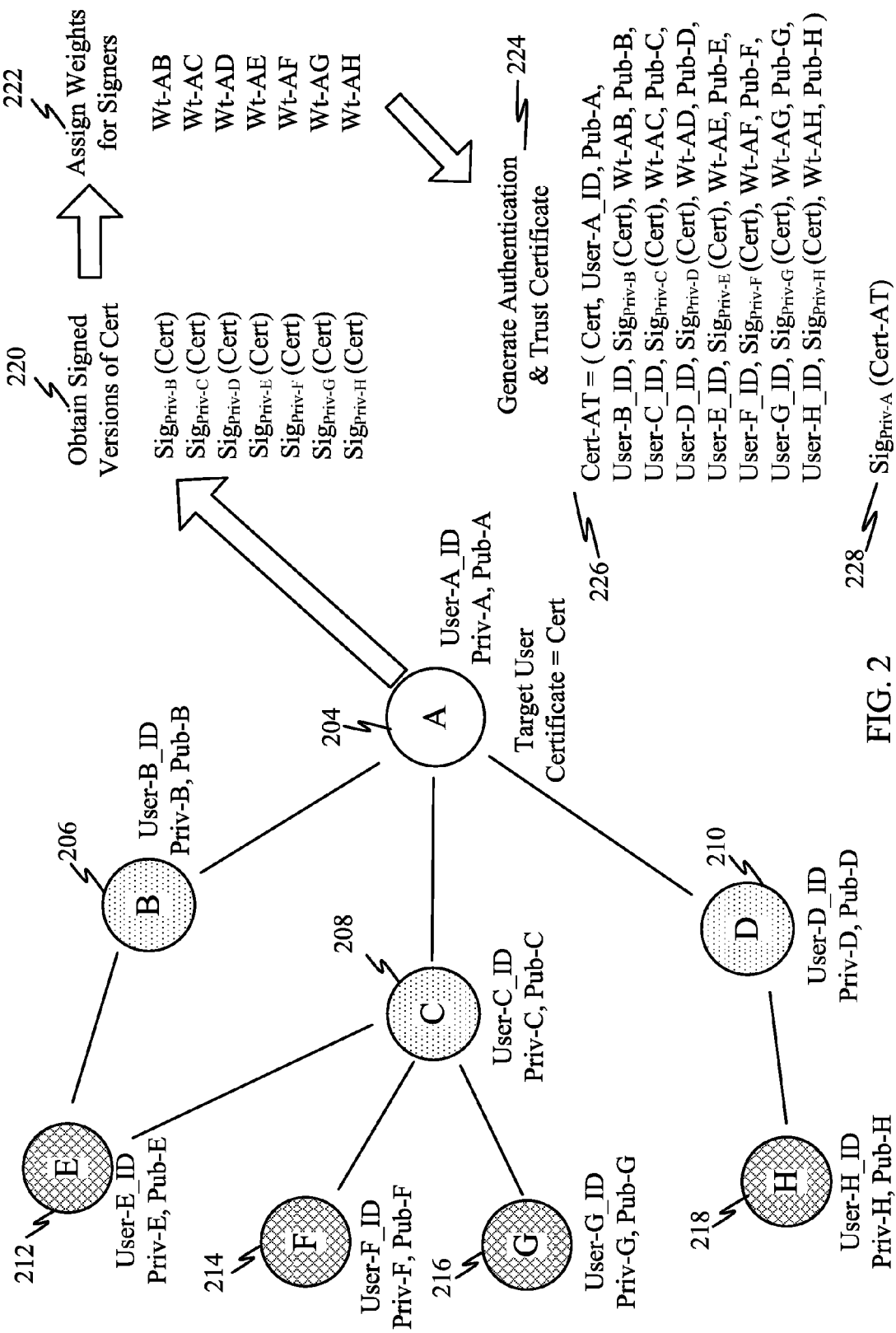
FIG. 2 is a block diagram illustrating an example of how an authentication and/or trust certificate may be generated for a target user.

FIG. 2 is a block diagram illustrating an example of how an authentication and/or trust certificate may be generated for a target user. In this example, a target user 204 (e.g., user device, node, or member) has an associated private key Priv-A and public key Pub-A and an initial/user certificate Cert, which may include a device/user identifier, random data, etc., and may be signed by the target user (e.g., using it private key Priv-A). In a first example, the initial/user certificate Cert may be presented as: Cert=random number. In a second example, the initial/user certificate Cert may be presented as: Cert=Pub-A, i.e., the public key associated with the target user. Note that in yet another example, the initial/user certificate Cert may be signed by the target user 204 prior to distribution to potential signer, thereby allowing the potential signers to authenticate the target user prior to signing.

The target user 204 sends the initial certificate Cert to one or more other users (e.g., other user devices, nodes, or members) with which the target user 204 has direct or indirect social relationships. One or more of the other users 206, 208, 210, 212, 214, 216, and/or 218 that directly or indirectly receive the initial/user certificate Cert from the target user 204 may respond by signing the certificate Cert using their own private key (e.g., Priv-B for user B 206, Priv-C for user C 208, Priv-D for user D 210, Priv-E for user E 212, Priv-F for user F 214, Priv-G for user G 216, and/or Priv-H for user H 218). Whether or not the other users 206, 208, 210, 212, 214, 216, and/or 218 decide to sign the initial/user certificate Cert for the target user 204 may depend on whether they have a trust relationship (e.g., either through a direct or indirect social link within a social network) with the target user 204. The various versions of the signed certificate Cert (e.g., $\text{Sig}_{Priv-B}$ (Cert), $\text{Sig}_{Priv-C}$ (Cert), $\text{Sig}_{Priv-D}$ (Cert), $\text{Sig}_{Priv-E}$ (Cert), $\text{Sig}_{Priv-F}$ (Cert), $\text{Sig}_{Priv-G}$ (Cert), $\text{Sig}_{Priv-H}$ (Cert)) may be sent to the target user 204.

The target user 204 may thus obtain or receive one or more signed versions of its initial certificate Cert 220 (e.g., $\text{Sig}_{Priv-B}$ (Cert), $\text{Sig}_{Priv-C}$ (Cert), $\text{Sig}_{Priv-D}$ (Cert), $\text{Sig}_{Priv-E}$ (Cert), $\text{Sig}_{Priv-F}$ (Cert), $\text{Sig}_{Priv-G}$ (Cert), $\text{Sig}_{Priv-H}$ (Cert)). According to one feature, the target user A 204 may optionally assign weights (e.g., Wt-AB, Wt-AC, Wt-AD, Wt-AE, Wt-AF, Wt-AG, and/or Wt-AH) to the interfaces with the responding users. These "interface" weights may be representative, for example, of the length or type of relationship the target user 204 has with any one of the particular user 206, 208, 210, 212, 214, 216, and/or 218 to which it assigns a weight. For instance, a, weight (e.g., within a range of weights) may be assigned or granted to user with whom the target user has a direct relationship rather than an indirect relationship. Similarly, a higher weight may be assigned or granted to a user who has known the target user 204 longest versus a user who only recently met the target user 204. In some instance, users that are highly regarded by a community or social network may be assigned a higher weight by the target user 204 virtue of such distinction or prominence.

In other implementations, the weights may be assigned to a particular signer (e.g., signing user) rather than to an interface between the target user and signing user. For example, a "user-specific" or "signer-specific" weight (Wt-S) may be generated by a community of users, a trusted third party, and/or the target user and assigned to a particular individual signer (e.g., signing user).

The target user 204 may then generate a composite or combined authentication and trust certificate 224 (e.g., Cert-AT 226) that includes the signed versions of the certificate Cert and/or the weights assigned to each signing user.

In one example the composite certificate Cert-AT may be represented as:
Cert-AT=(Cert, User-A_ID, Pub-A,
    User-B_ID, $\text{Sig}_{Priv-B}$ (Cert), Wt-AB,
    User-C_ID, $\text{Sig}_{Priv-C}$ (Cert), Wt-AC,
    User-D_ID, $\text{Sig}_{Priv-D}$ (Cert), Wt-AD,
    User-E_ID, $\text{Sig}_{Priv-E}$ (Cert), Wt-AE,
    User-F_ID, $\text{Sig}_{Priv-F}$ (Cert), Wt-AF,
    User-G_ID, $\text{Sig}_{Priv-G}$ (Cert), Wt-AG,
    User-H_ID, $\text{Sig}_{Priv-H}$ (Cert), Wt-AH).

This version of the composite certificate Cert-AT may assume that the public keys for the signers of the user certificate Cert is known or obtainable by a recipient or validating party. For instance, the public key may already be distributed throughout a network or can be independently obtained by a validating party, so the public keys may not be included.

In the example illustrated in FIG. 2, the composite certificate Cert-AT may be represented as:
Cert-AT=(Cert, User-A_ID, Pub-A,
    User-B_ID, $\text{Sig}_{Priv-B}$ (Cert), Wt-AB, Pub-B,
    User-C_ID, $\text{Sig}_{Priv-C}$ (Cert), Wt-AC, Pub-C,
    User-D_ID, $\text{Sig}_{Priv-G}$ (Cert), Wt-AD, Pub-D,
    User-E_ID, $\text{Sig}_{Priv-E}$ (Cert), Wt-AE, Pub-E,
    User-F_ID, $\text{Sig}_{Priv-F}$ (Cert), Wt-AF, Pub-F,
    User-G_ID, $\text{Sig}_{Priv-G}$ (Cert), Wt-AG, Pub-G,
    User-H_ID, $\text{Sig}_{Priv-H}$ (Cert), Wt-AH, Pub-H).

In this version of the composite certificate Cert-AT, the user device may append the public keys for the signers of the user certificate Cert.

In yet another example, the composite certificate Cert-AT may be represented as:
Cert-AT=(Cert, User-A_ID, Pub-A,
    $\text{Sig}_{Priv-B}$ (Cert), Wt-AB,
    $\text{Sig}_{Priv-C}$ (Cert), Wt-AC,
    $\text{Sig}_{Priv-D}$ (Cert), Wt-AD,
    $\text{Sig}_{Priv-E}$ (Cert), Wt-AE,
    $\text{Sig}_{Priv-F}$ (Cert), Wt-AF,
    $\text{Sig}_{Priv-G}$ (Cert), Wt-AG,
    $\text{Sig}_{Priv-H}$ (Cert), Wt-AH,
    User-B . . . User-H, User-I . . . User-R,
    Pub-B . . . Pub-H).

In this version of the composite certificate Cert-AT, all user identities (i.e., User-B . . . User-H and User-I . . . User-R) for all identified potential signers are appended to the composite certificate, optionally, along with their corresponding public keys). In this example, users User-I . . . User-R are non-signing users. Note that, in other examples, the identities of all identified potential signers (i.e., User-B . . . User-H and User-I . . . User-R) may be appended or included as part of the initial/user certificate Cert sent to the potential signers.

In yet another example, the composite certificate Cert-AT may be represented as:
Cert-AT=(Cert, User-A_ID, Pub-A,
    User-B_ID, $\text{Sig}_{Priv-B}$ (Cert), Wt-B,
    User-C_ID, $\text{Sig}_{Priv-C}$ (Cert), Wt-C,
    User-D_ID, $\text{Sig}_{Priv-D}$ (Cert), Wt-D,
    User-E_ID, $\text{Sig}_{Priv-E}$ (Cert), Wt-E,
    User-F_ID, $\text{Sig}_{Priv-F}$ (Cert), Wt-F,
    User-G_ID, $\text{Sig}_{Priv-G}$ (Cert), Wt-G,
    User-H_ID, $\text{Sig}_{Priv-H}$ (Cert), Wt-H).

In this version of the composite certificate Cert-AT, each weight may be assigned to a specific signer (i.e., User-B has weight Wt-B, User-C has weight Wt-C, etc.) rather than an interface between the target user and particular signer. For example, a community of users, a trusted third party, and/or the target user may assign a weight to a particular individual signer. Note that, in some implementations, the public keys for at least the signers (e.g., signing users) may also be included as part of the certificate (Cert-AT). While various examples herein may be illustrated using interface weights (e.g., between the target user and a signer), it should be clear these weights may be replaced with user-specific weights (e.g., signer-specific weights).

Additionally, a signature may be generated by the target user over the composite certificate Cert-AT or selected portions or parts of the composite certificate Cert-AT. For instance, in some examples, the signature may exclude the public keys for the signing users since these may already be known. Also, the inclusion of the weights for each signing user may be optional in implementations where a validating user assigns its own weights and/or does not consider the weights assigned by the target user 204. For purposes of authentication, the composite or combined authentication and trust certificate Cert-AT 226 may be signed by the private key Priv-A of the target user 204 to obtain a signed version of Cert-AT 228 and authenticable by the corresponding public key Pub-A.

The target user 204 may then send or distribute the composite or combined authentication and trust certificate Cert-AT 226 along with a signed version of the certificate 228 as a means to authenticate its self to other users and as a way to provide trust credentials that can be readily verified by those other users. For instance, recipient users within a social network may be able to verify the signatures of other users of the social network in order to generate a trust metric for the target user 204.

In one example, the weight assigned to the other users 206, 208, 210, 212, 214, 216, and/or 218 may be generated in various ways. For instance, a weight for a second node (from the point of view of a first node) may be assigned at the edge or interface between the first and second nodes. The first node may assign the weight to the second node, for example, based on how long it has had a relationship or known the second node, the trust the first node has of the second node, and/or the trust/relationship with other intermediate nodes, among other factors and/or criteria.

According to an alternative implementation, the weights may be communicated separate (e.g., out-of-band) from the composite certificate. For instance, a recipient may receive the composite certificate Cert-AT (which does not include signer weights) and then obtain/receive/request the weights for signers identified therein from the target user, the signers themselves, and/or a trusted third party.

Figure 3:
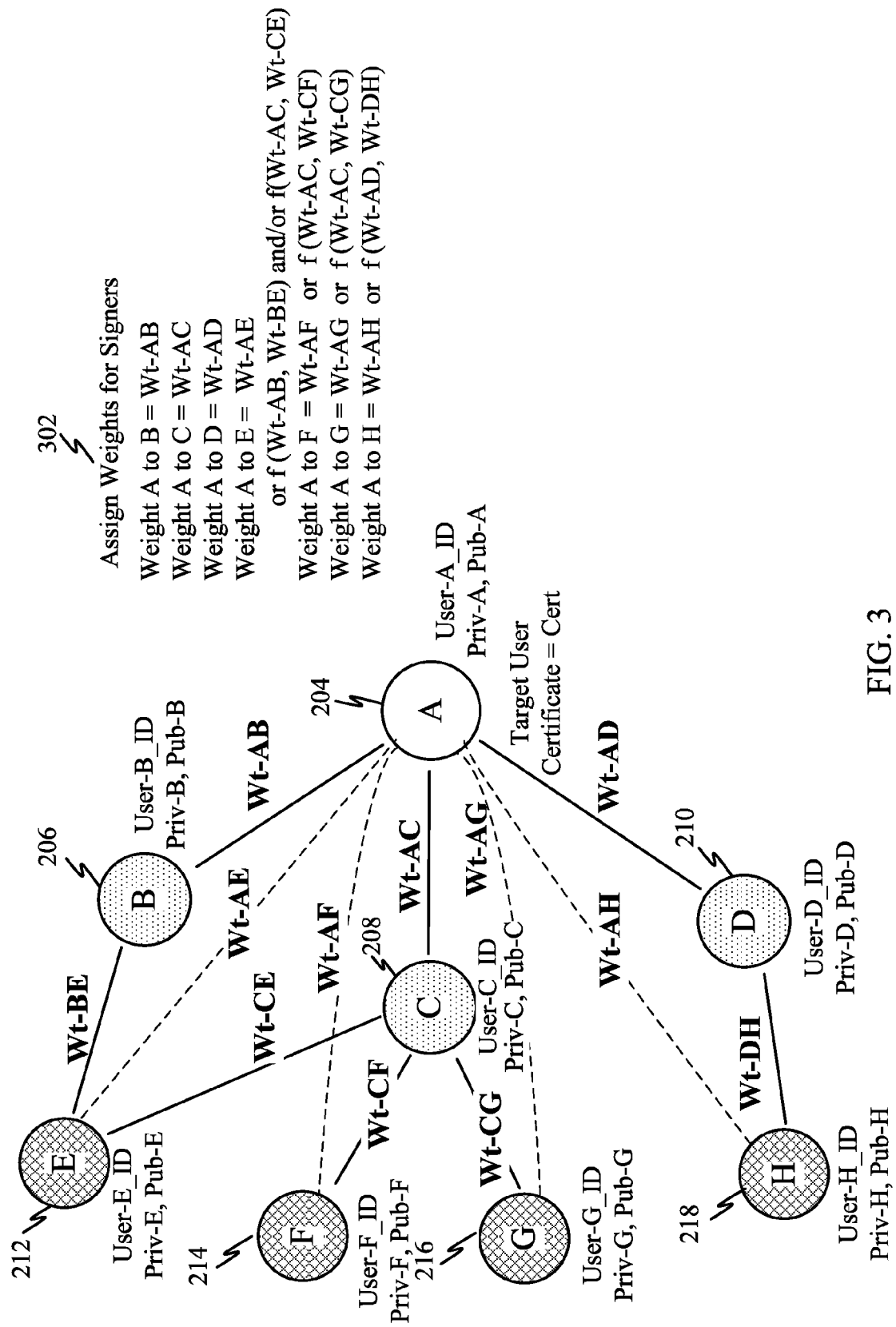
FIG. 3 is a block diagram illustrating an example of how an authentication and/or trust certificate for a target user may be used by a validating user.

FIG. 3 illustrates how node/user weights may be generated by a target user for other nodes or users. In this example, each node/user may have established weights for direct relationships with between other nodes/users. For example, target user A 204 has assigned weights Wt-AB, Wt-AC, and Wt-AD with direct relationship users 206, 208, and 210, respectively. Similarly, in some implementations, the target user A 204 may assign weights Wt-AE, Wt-AF, Wt-AG, and Wt-AH to indirect relationship users 212, 214, 216, and 218, respectively. In this implementation, the target user A 204 may independently ascertain a weight for each of the users (e.g., potential signers). For example, the target user A 204 may assign a weight to an indirect relationship user based on: (a) its own knowledge of the indirect relationship user, (b) a relationship with one or more intermediate users, and/or (c) the "distance" (e.g., number of intermediate hops or nodes) to the indirect relationship user.

From the point of view of the target user A 204, various weights Wt-AX are established, generated, and/or assigned for direct or indirect relationships between target user A 204 and the other nodes/users X. For instance, the target user A 204 may assign direct weights Wt-AB, Wt-AC, and Wt-AD for user/nodes B 206, C 208, and D 210, respectively, with which it has a direct relationship. In this example, for indirect relationships, the target user A 204 may generate on weights Wt-EB, Wt-EC, Wt-CF, Wt-CG, and/or Wt-DH for the indirect nodes/users E 212, F 214, G 216, and H 218, respectively.

Figure 4:
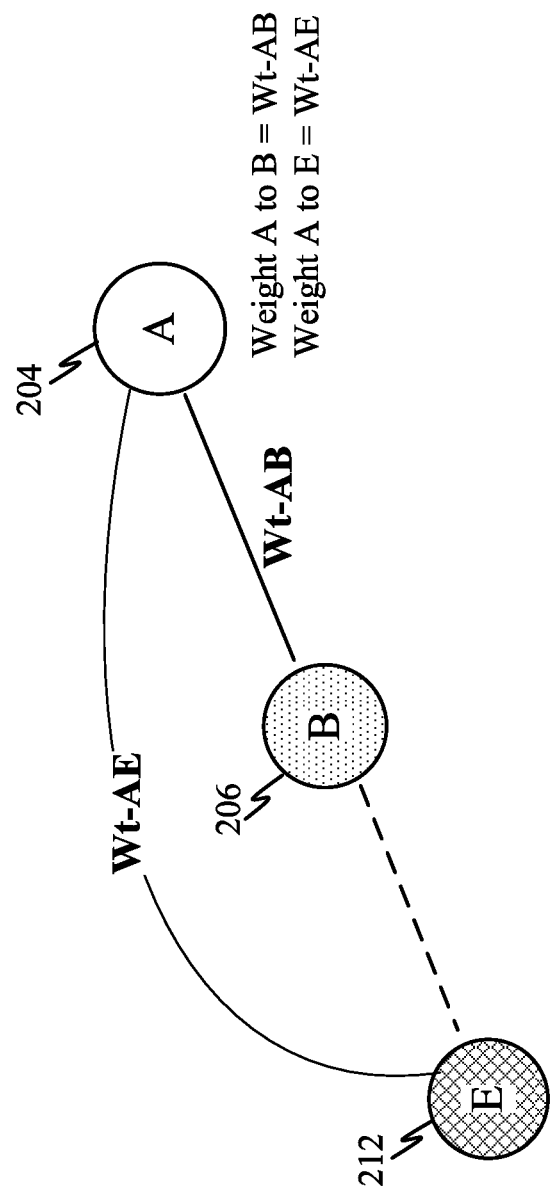
FIG. 4 (comprising FIGS. 4A and 4B) is a flow diagram illustrating the operation of a plurality of devices for generating a social graph based certificate and computing trust metrics for a user device based on endorsements by one or more signer devices.
Figure 5:
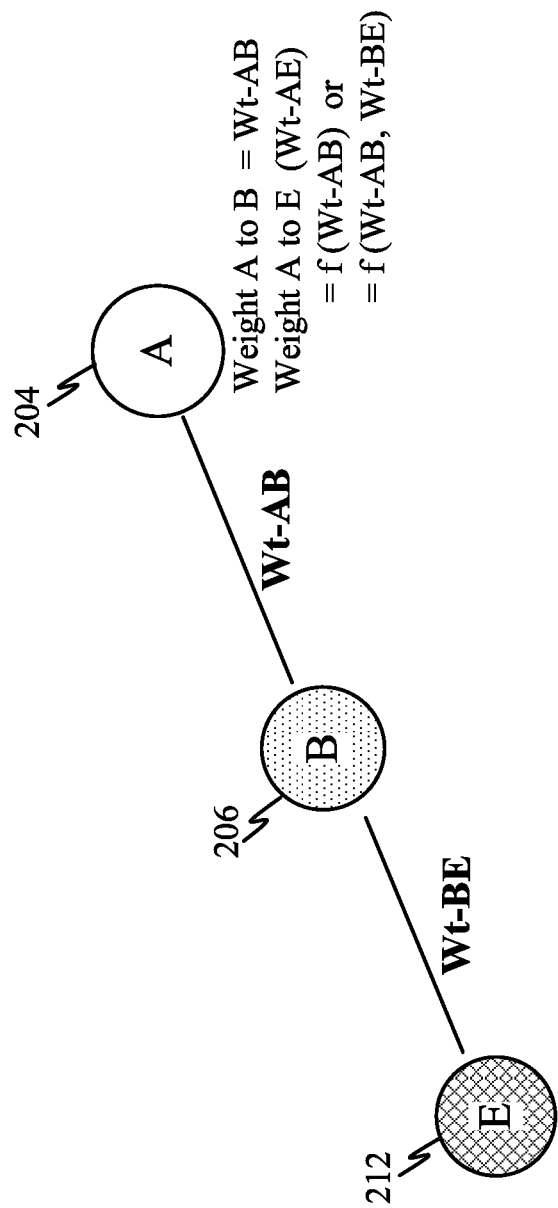
FIG. 5 illustrates a block diagram of a user device according to one example.
Figure 6:
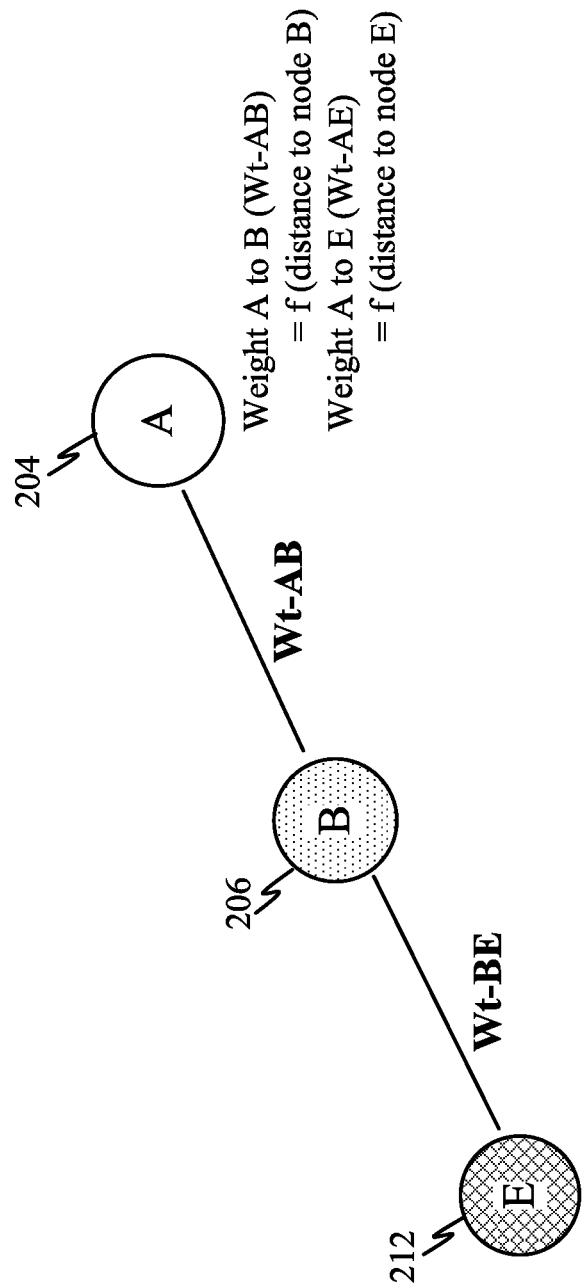
FIG. 6 illustrates an example of the operation of the user device for facilitating generation of social network-based trust metrics.

As illustrated in FIGS. 4, 5, and 6, various different methods may be implemented for assigning weights for indirect users/nodes to a target user.

FIG. 4 illustrates a weight assignment method implemented by a target user A for both direct and indirect relationship nodes/users. For example, user/node B 206 may have a direct relationship with user/node E 212. In this example, the target user 204 may assign a weight Wt-AB to a direct relationship node/user B 206. Similarly, and independent of node/user B, the target user A 204 may assign or generate a weight Wt-AE for the indirect relationship node/user E 212. For example, such selection of a weight for indirect relationship node/user E 212 may be based on the reputation of user/node E 212 within the network and/or prior dealings between target user A 204 and the user/node E 212. In this manner, target user A 204 may obtain a weight Wt-BE that it can use to generate a weight Wt-EA for user/node E 212.

FIG. 5 illustrates another weight assignment method implemented by a target user A for both direct and indirect relationship nodes/users. In this example, the weight assigned to an indirect user/node may be based, at least partially, on weight(s) assigned to an intermediate relationship. For example, user/node B 206 may be an intermediary node/user between the target user A 204 and user/node E 212. Having assigned a weight Wt-AB to node/user B 206, the target user 204 may then assign a weight Wt-AE to indirect relationship node/user E 212 based, wholly or partially, on the weight assigned to user/node B (i.e., Wt-AE=f(Wt-AB)). Alternatively, in another implementation, the node/user B 206 may provide or assign a weight Wt-BE to the node/user E 212 and provides that weight Wt-BE to the target user/node A 204. The target user 204 may then assign a composite weight Wt-AE to indirect relationship node/user E 212 based, wholly or partially, on the weight assigned to user/node B 206 and the weight assigned by node/user B 206 to node/user E 212 (i.e., Wt-AE=f(Wt-AB, Wt-BE)). When a composite weight is provided, a notification/indicator may also be provided to distinguish it from a direct weight.

FIG. 6 illustrates yet another weight assignment method implemented by a target user A for both direct and indirect relationship nodes/users. In this example, the target node/user A 204 may assign or generate a weight for other nodes based on its "distance" to a node/user (e.g., hops or number of intermediate nodes/users). For instance, the user/node B 206 may be assigned a weight Wt-AB that is a function of the proximity of node/user A 204 to node/user B 206 (i.e., f (distance to node B)). In this example, node/user B 206 is only one hop away from the target user/node A 204. Similarly, the user/node E 212 may be assigned a weight Wt-AE that is a function of the proximity or indirect relationship from node/user A 204 to node/user E 212 (i.e., f (distance to node E)). In this example, node/user E 212 is two hops away from the target user/node A 204.

Note that other methods for assigning weights to nodes/users may be implemented and are contemplated within the scope of the present disclosure. In some examples, two or more of the technique illustrated in FIGS. 4, 5 and/or 6 may be combined to assign/generate a user/node weight.

Figure 7:
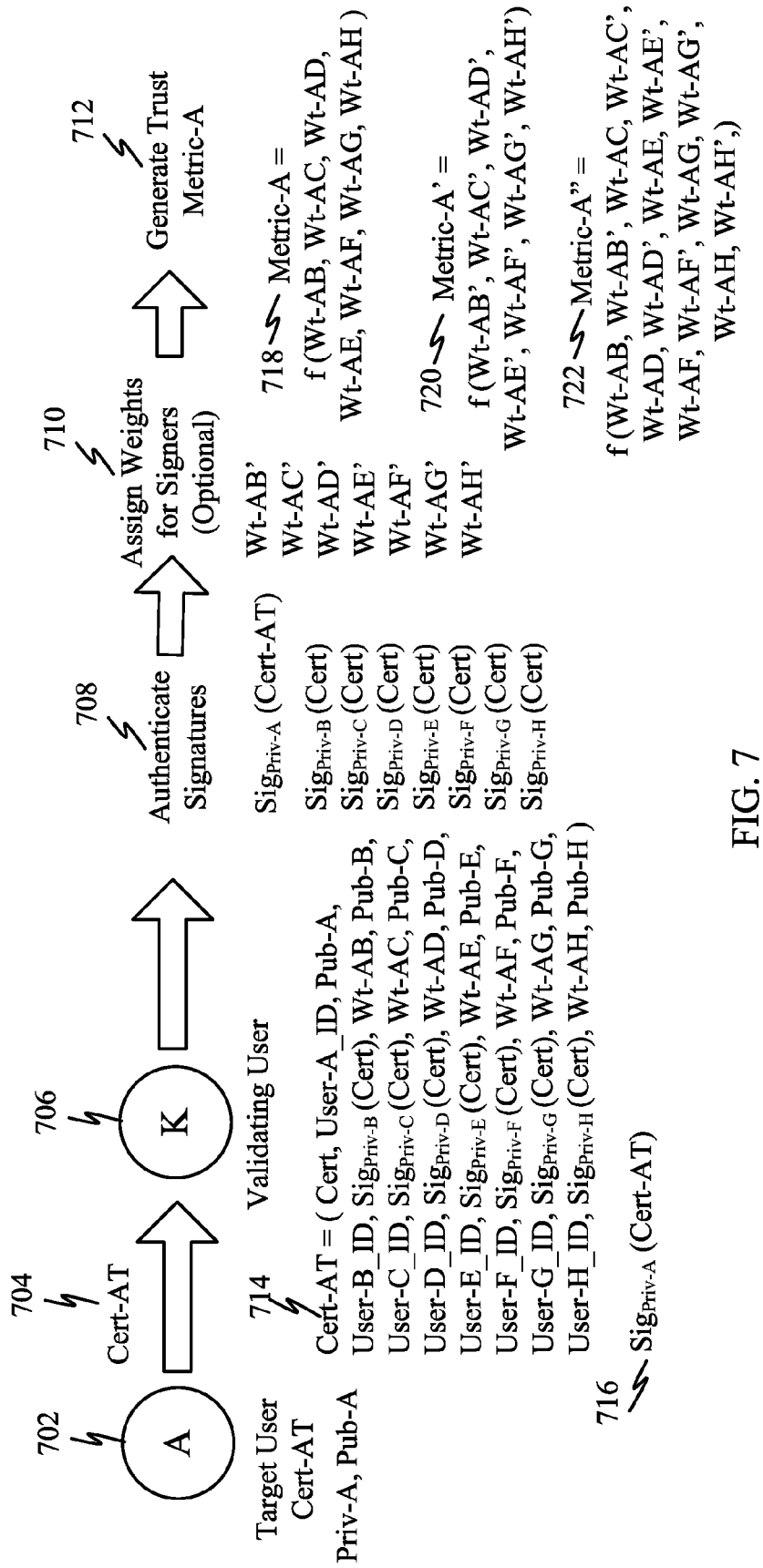
FIG. 7 illustrates a block diagram of an internal structure of a signer device according to one example.

FIG. 7 is a block diagram illustrating an example of how an authentication and/or trust certificate for a target user may be used by a validating user. In this example, the target user 702 has sent its authentication and trust certificate Cert-AT 704 to a validating user 706. For instance, the target user 702 may be seeking to obtain some data or perform a transaction with the validating user 706. Alternatively, the target user 702 may be seeking to obtain some data or perform a transaction with another user that is using the validating user 706 for authentication and/or trust generation services.

In this example, the authentication and/or trust composite certificate Cert-AT 704 may include the target user certificate Cert, a target user identifier User-A_ID, and the target user public key Pub-A. Additionally, the composite certificate Cert-AT 704 may also include user identifiers/identities for the signing users (e.g., User-B_ID, User-C_ID, User-D_ID, User-E_ID, User-F_ID, User-G_ID, User-H_ID), signed versions of the user certificate Cert signed by these users (e.g., $\text{Sig}_{Priv-B}$ (Cert), $\text{Sig}_{Priv-C}$ (Cert), $\text{Sig}_{Priv-D}$ (Cert), $\text{Sig}_{Priv-E}$ (Cert), $\text{Sig}_{Priv-E}$ (Cert), $\text{Sig}_{Priv-G}$ (Cert), $\text{Sig}_{Priv-H}$ (Cert)), (optionally) weights for each signing user (assigned by the target user 704), as well as the public key (e.g., Pub-B, Pub-C, Pub-D, Pub-E, Pub-F, Pub-G, Pub-H) for each of the signing users. In some examples, the versions of the user certificate Cert signed by other users (e.g., $\text{Sig}_{Priv-B}$ (Cert), $\text{Sig}_{Priv-C}$ (Cert), $\text{Sig}_{Priv-D}$ (Cert), $\text{Sig}_{Priv-E}$ (Cert), $\text{Sig}_{Priv-E}$ (Cert), $\text{Sig}_{Priv-G}$ (Cert), $\text{Sig}_{Priv-B}$ (Cert)) may be understood or implied to be a form of sponsorship or endorsement of the target user 702.

Upon receipt of the authentication and/or trust composite certificate Cert-AT 704, the validating user 706 may authenticate the composite certificate Cert-AT, i.e., using the public key Pub-A associated with the target user 702. The validating user 706 may also authenticate one or more of the signed versions of the user certificate Cert (e.g., $\text{Sig}_{Priv-B}$ (Cert), $\text{Sig}_{Priv-C}$ (Cert), $\text{Sig}_{Priv-D}$ (Cert), $\text{Sig}_{Priv-E}$ (Cert), $\text{Sig}_{Priv-F}$ (Cert), $\text{Sig}_{Priv-G}$ (Cert), $\text{Sig}_{Priv-H}$ (Cert)), i.e., using the public keys (e.g., Pub-B, Pub-C, Pub-D, Pub-E, Pub-F, Pub-G, and Pub-H) for the signing users (e.g., User-B, User-C, User-D, User-E, User-F, User-G, and User-H). The validating user 706 may also authenticate the target user A 702 by using the signed authentication and/or trust composite certificate $\text{Sig}_{Priv-A}$ (Cert-AT) 716 using the target user's 702 public key Pub-A. If the authentication and/or trust composite certificate Cert-AT 714 is successfully authenticated, then the validating user 706 may proceed to generate or compute a trust metric 712 for the target user 702.

In some implementations, the trust metric (Metric A 718) may be computed or generated as a function (f) of the one or more weights (e.g., Wt-AB, Wt-AC, Wt-AD, Wt-AE, Wt-AF, Wt-AG, Wt-AH) for the signing users (e.g., User-B, User-C, User-D, User-E, User-F, User-G, and User-H) of the authentication and trust certificate Cert-AT 714 for the target user 702. The function may combine the one or more weights (e.g., Wt-AB, Wt-AC, Wt-AD, Wt-AE, Wt-AF, Wt-AG, Wt-AH) to generate the metric (Metric A 718).

In another implementation, the validating user 706 may assign its own weights 710 (e.g., Wt-AB', Wt-AC', Wt-AD', Wt-AE', Wt-AF', Wt-AG', Wt-AH') to the signing users (e.g., User-B, User-C, User-D, User-E, User-F, User-G, and User-H) that signed the authentication and trust certificate (Cert-AT) 714. This allows the validating user to decide for itself which users should be given greater weight. The weights assigned by the validating user 706 may then be used to generate or compute a trust metric (Metric-A' 720) for the target user 702.

In yet another implementation, multiple sets of weights may be combined to generate a trust metric (Metric-A" 722) for the target user 702. For example, weights assigned by the target user and the validating user for the signing users may be combined to obtain the trust metric. In another example, for signers known to the target user of target user-assigned signer weight is solely determined by the target user, while for signers unknown to the target user the user-assigned signer weight is at least partially based on weights provided by known signers for such unknown signers.

In some implementations, a user certificate timestamp or lifetime indicator may be appended to the certificate Cert-AT at the target user device prior to distribution to one or more recipients.

Figure 8A:
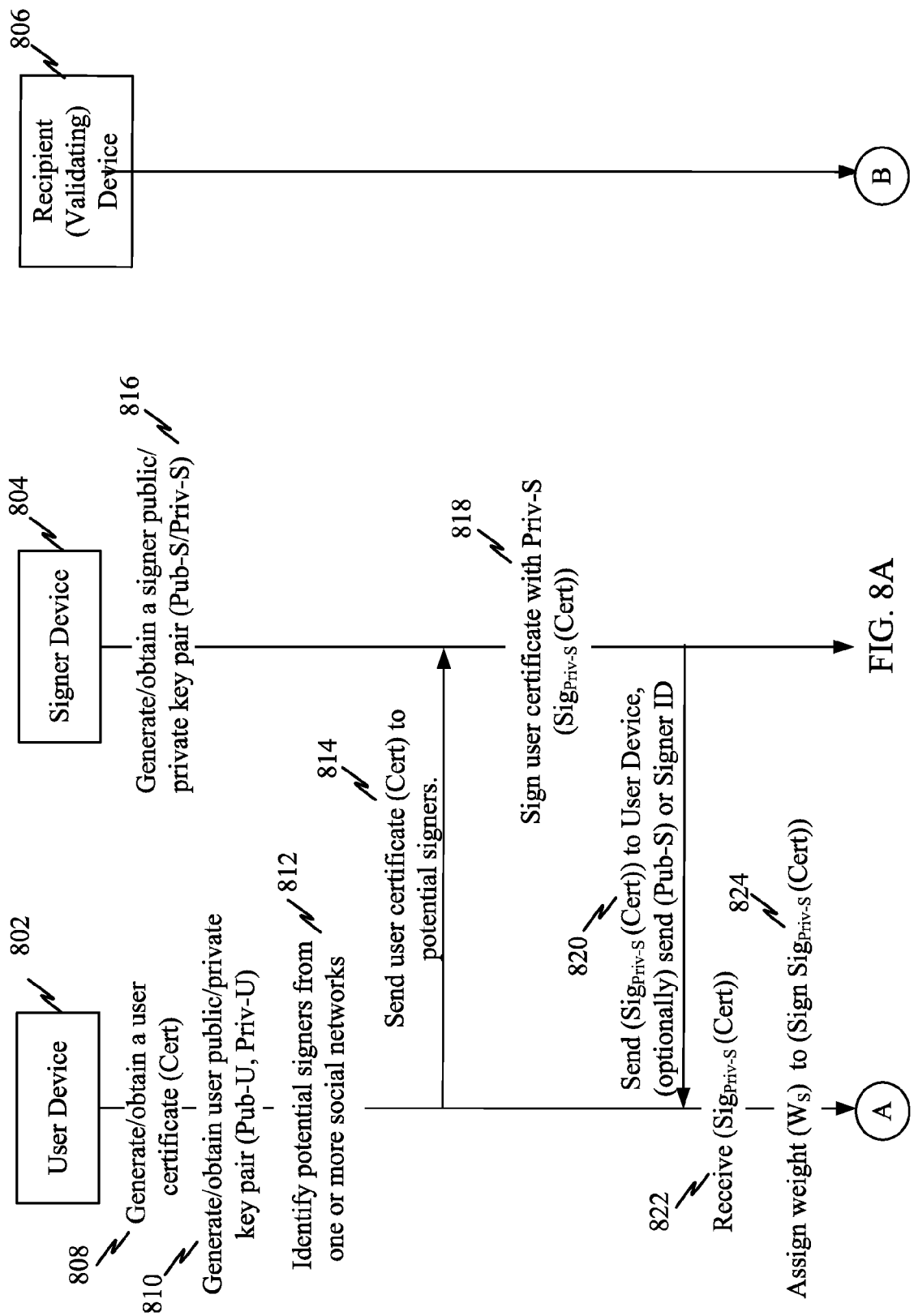
FIG. 8 illustrates an example of the operation of the signer device to facilitate generation a social network based user certificate.
Figure 8B:
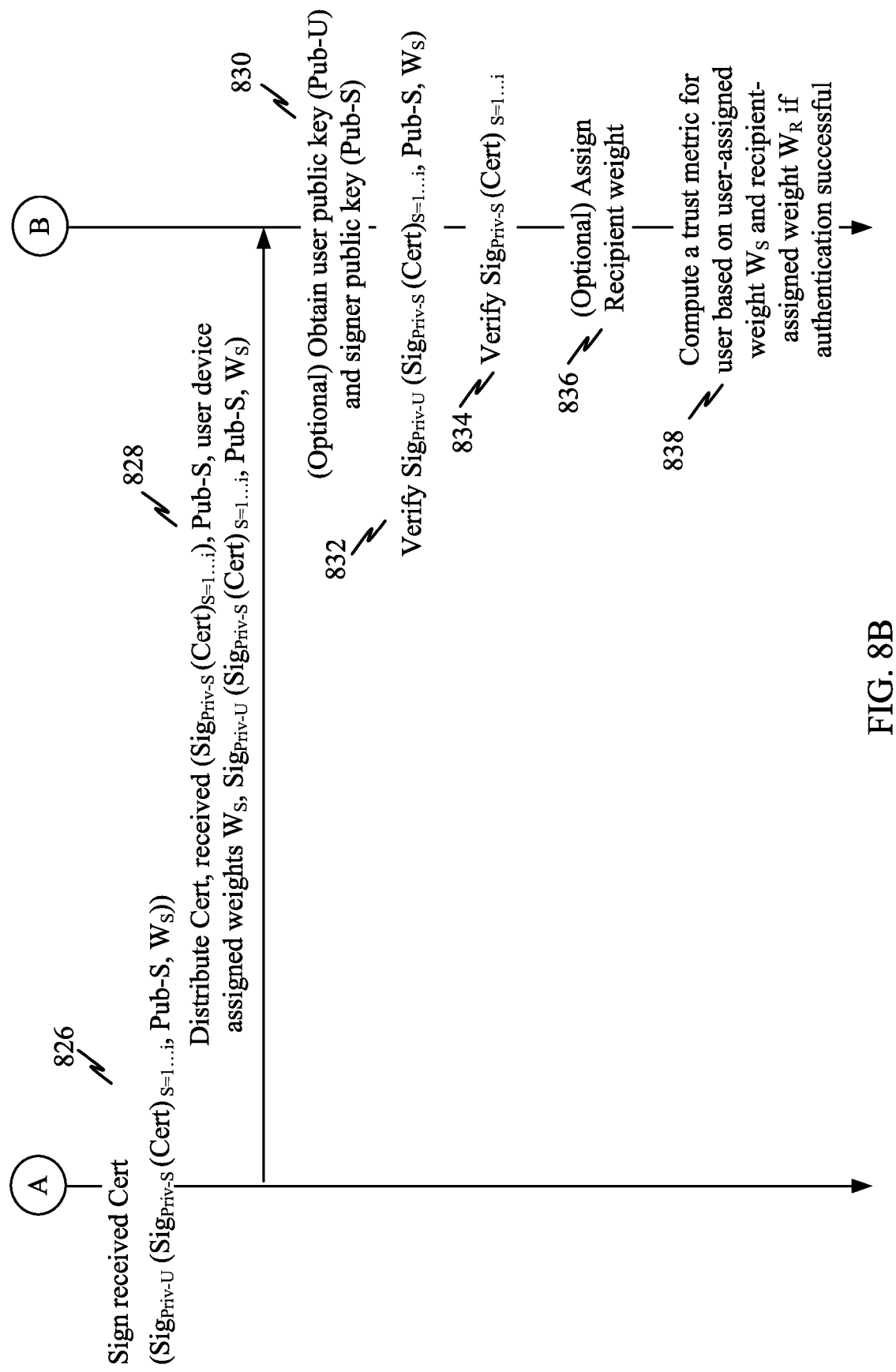

FIG. 8 (comprising FIGS. 8A and 8B) is a flow diagram illustrating the operation of a plurality of devices for generating a social graph based certificate and computing trust metrics for a user device based on endorsements by one or more signer devices. A user (user device 802) may have a certificate that is signed by one or more signers (signer device 804) and used by the user for authentication purposes with one or more recipients (recipient device 806). Furthermore, the recipient (validating) device 806 may compute a trust metric associated with the signer device 804 for the user device 802 based on various different factors as described in more detail below.

For purposes of illustration, in FIG. 8 a user certificate Cert is being used to present to other users. However, one implementation may use a Pretty Good Privacy (PGP)-like approach and use the user's public key as the certificate Cert. Since the user's public key can only be used to authenticate a signature that was generated using the user's corresponding private key, there is a degree of security in this approach as only the party holding the private key can generate the signature. Also, because the user's certificate is merely being used as a vehicle to collect signatures from other users, its value may be irrelevant so long as the certificate can be authenticated.

The user device 802 may generate or obtain a certificate (Cert) 808. For example, the certificate may be obtained from a trusted 3$^{rd}$ party Certificate Authority. Next, the user device 802 may obtain or generate a user public/private key pair comprising a user public key (Pub-U) and a corresponding user private key (Priv-U) 810. Potential signers may be identified from one or more social networks of which the user device is a member 812. The social networks may include, but are not limited to, Facebook®, Linkedin®, Flickr® and Bebo®. Once the potential signers have been identified, the certificate may be sent from the user device 802 to signer devices 804 for one or more of the potential signers 814. Each signer device 804 that receives the certificate may have generated or obtained a signer public/private key pair comprised of a signer public key (Pub-S) and a corresponding signer private (Priv-S) 816. Using its signer private key (Priv-S), each signer device may sign the certificate ($\text{Sig}_{Priv-S}$ (Cert)) 818 and send the signed certificate ($\text{Sig}_{Priv-S}$ (Cert)) to the user device 820. Optionally, the signer device 804 may also send its public key (Pub-S) or its user/device identifier (Signer ID) in addition to the signed certificate ($\text{Sig}_{Priv-S}$ (Cert)).

The user device 802 may then receive one or more signed certificates ($\text{Sig}_{Priv-S}$ $(\text{Cert})_{S=1 \ldots i}$), where S=the number of potential signers which received the original certificate from the user device 822. Next, the user device 802 may assign a user weight ($W_S$) to each of the signed certificates ($\text{Sig}_{Priv-S}$ $(\text{Cert})_{S=1 \ldots i}$) received from signer devices 824. The user (signer) weights ($W_S$) assigned to each signer may be influenced by a number of factors (e.g., which may be gleaned from a social network connection), including but not limited to, the circumstances of how the user and signer became acquainted, how long the user has known the signer and the history and types of interactions between the user and the signer. After being assigned a user weight, the received certificates ($\text{Sig}_{Priv-S}$ $(\text{Cert})_{S=1 \ldots i}$) may be signed ($\text{Sig}_{Priv-U}$ ($\text{Sig}_{Priv-S}$ $(\text{Cert})_{S=1 \ldots i}$, Pub-S, $W_i$)) by the user device using the user private key (Priv-U) 826 to obtain a user signature. Note that other information may be signed with the user key (Priv-U) as well, including the user weights ($W_S$) and/or signer identifier or signer public keys Pub-S.

The user device 802 may then distribute, to the recipient (validating) device 806, the original certificate (Cert), the received signed certificates ($\text{Sig}_{Priv-S}(\text{Cert})_{S=1\ldots i}$), the signer public key (Pub-S), the user-assigned signer weights ($W_S$) and/or the user signature ($\text{Sig}_{Priv-U}(\text{Sig}_{Priv-S}(\text{Cert})_{S=1\ldots i}, \text{Pub-S}, W_S)$) 828.

Optionally, the recipient device 806 may independently generate or obtain the user public key (Pub-U) and the signer public key (Pub-S) 830. Next, the recipient device 806 may verify/authenticate the user signature ($\text{Sig}_{Priv-U}(\text{Sig}_{Priv-S}(\text{Cert})_{S=1\ldots i}, \text{Pub-S}, W_S)$) using the user public key (Pub-U) 832. The recipient device 806, using the signer public keys (Pub-S), may then verify each of the received certificates ($\text{Sig}_{Priv-S}(\text{Cert})_{S=1\ldots i}$) signed by the signer devices 834.

Once verification/authentication of the user signature ($\text{Sig}_{Priv-U}(\text{Sig}_{Priv-S}(\text{Cert})_{S=1\ldots i}, \text{Pub-S}, W_S)$) and signed versions of the user certificate ($\text{Sig}_{Priv-S}(\text{Cert})_{S=1\ldots i}$) has occurred, the recipient device 806 may optionally assign its own recipient-assigned signer weight ($W_R$) to each signed user certificate ($\text{Sig}_{Priv-S}(\text{Cert})_{S=1\ldots i}$) 836. Upon, successful authentication (steps 832 and 834), the recipient device 806 may compute a trust metric based on the user-assigned signer weights ($W_S$) and/or recipient-assigned signer weights ($W_R$) 838.

Exemplary User Device and Operations Therein

Figure 9:
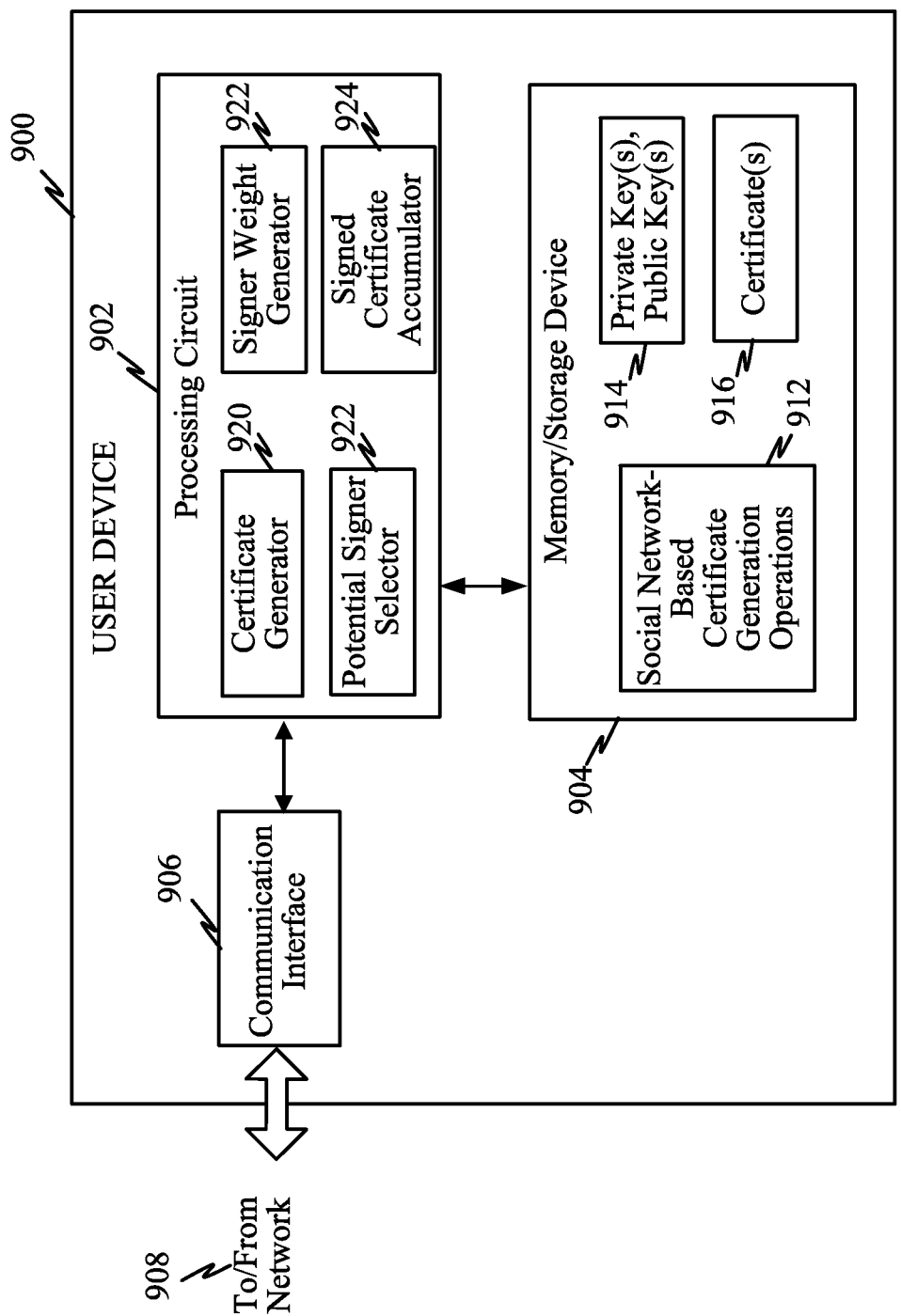
FIG. 9 illustrates a block diagram of an internal structure of a recipient device according to one example.

FIG. 9 illustrates a block diagram of a user device 900 according to one example. The user device 900 may include a processing circuit 902 (e.g., one or more processors, processing modules, sub-circuits, etc.) coupled to a memory/storage device 904 and/or a communication interface 906. The memory/storage device 904 may serve to store public/private keys 914 and one or more signed/unsigned certificates 916. The communication interface 906 (e.g., including a transmitter circuit and/or a receiver circuit) may serve to communicatively couple the user device 900 to a wireless communication network 908, e.g., allowing the user device 900 to become part of and/or communicate with other devices within a social network and/or an online community.

According to one feature, the memory/storage device 904 may store one or more operations or instructions 912, which when executed by the processing circuit 902, causes the processing circuit to generate a social network based certificate.

Additionally, the processing circuit 902 may execute these operations/instructions stored in the memory/storage device 904. For example, the processing circuit may:
(a) obtain user Public Key (Pub-U) and corresponding user Private Key (Priv-U);
(b) obtain user Certificate (Cert) (e.g., Cert=user Public Key or a Cert from a trusted third party Certificate Authority);
(c) identify potential signers from one or more social networks; and/or
(d) distribute user certificate (Cert) to potential signers.

In response to distributing the user certificate (Cert), the user device 900 may:
(a) receive one or more signed versions of user certificate $\text{Sig}_{Priv-S}(\text{Cert})_{S=1\ldots i}$ from other users;
(b) assign a weight ($W_S$) to each user that signs the user certificate; and/or
(c) sign a composite Cert=$\text{Sig}_{Priv-U}$ (Cert, $\text{Sig}_{Priv-S}(\text{Cert})_{S=1\ldots i}$, Pub-S, $W_S$).

The user device 900 may then distribute the composite certificate (e.g., authentication and trust certificate Cert-AT) that includes: user Cert, one or more signed versions of user certificate $\text{Sig}_{Priv-S}(\text{Cert})_{S=1\ldots i}$, and user-assigned signer weights Ws, along with the composite user signature $\text{Sig}_{Priv-U}(\text{Sig}_{Priv-S}(\text{Cert})_{S=1\ldots i}, \text{Pub-S}, W_S)$, among other parameters.

According to another example, the processing circuit 902 may include a certificate generator 920 adapted to generate its user certificate Cert and/or the composite user certificate (e.g., based on social network contributions), a potential signer selector 922 adapted to find/select the potential signers from a social network to which the user certificate is sent for signing, a signer weight generator 922 adapted to assign weights to those signers that send signed user certificates to the user device, and/or a signed certificate accumulator 924 that receives the signed user certificates from potential signers. These circuits alone or in combination with other circuits of the processing circuit 902 and/or the information available from the memory/storage device 904 may perform the functions and/or steps to generate a social network based composite user certificate (e.g., a combined authentication and trust certificate).

Figure 10:
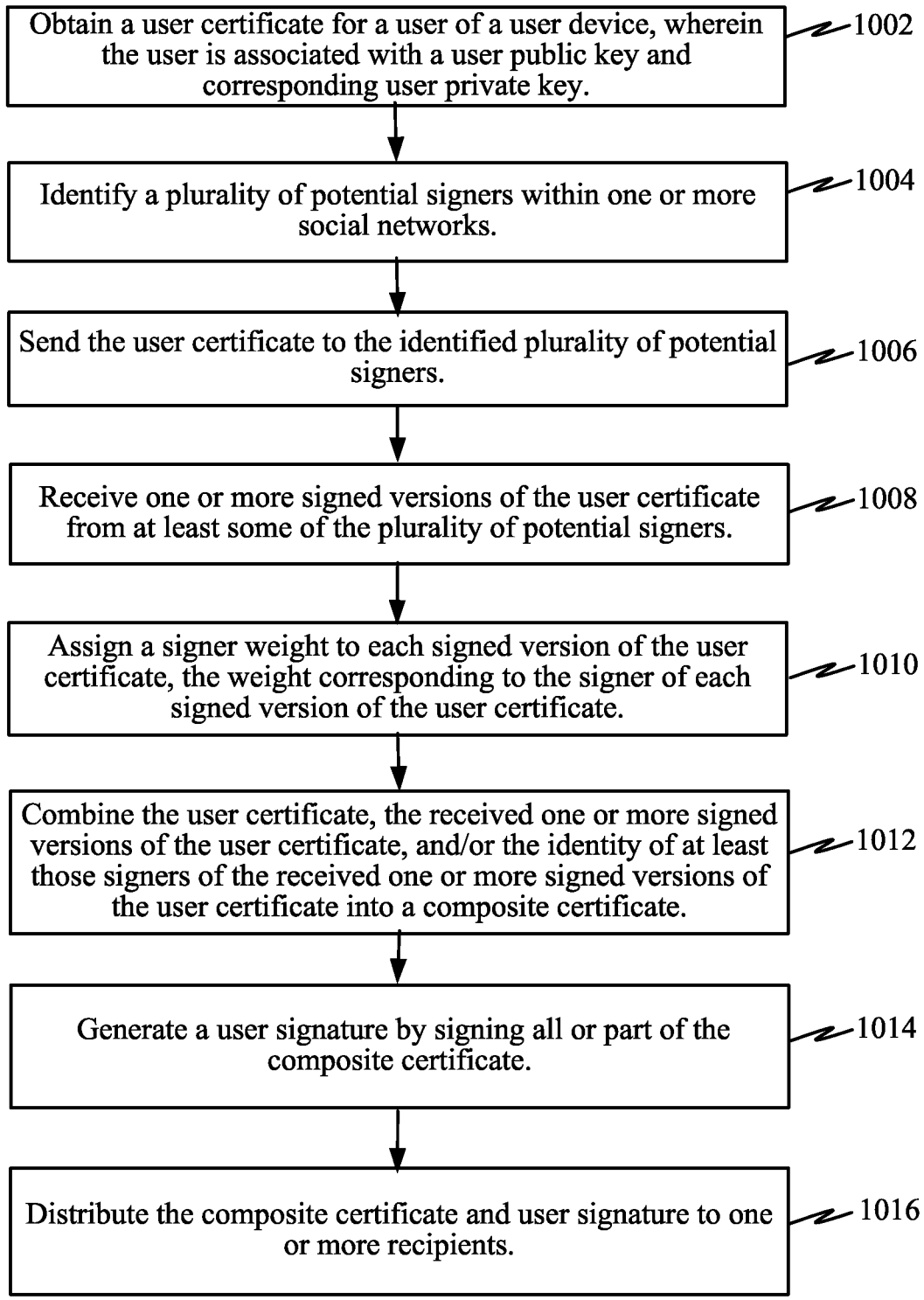
FIG. 10 illustrates an example of the operation of the recipient device to generate a social network based trust metric for a user.

FIG. 10 illustrates an example of the operation of the user device for facilitating generation of social network-based trust metrics. The user device may obtain a user certificate for a user of a user device, wherein the user is associated with a user public key (Pub-U) and a corresponding user private key (Priv-U) 1002. In one example, the user certificate may be the user public key. Alternatively, the user certificate may be obtained from a trusted third party Certificate Authority. Next, the user device may identify a plurality of potential signers from within one or more social networks 1004. For instance, the plurality of potential signers may be identified from contacts derived from emails and/or an address book for the user. The social networks may include, but are not limited to, Facebook®, Linkedin®, Flickr® and Bebo®. Once the potential signers have been identified, the user certificate (Cert), e.g., user public key) may be sent from the user device to the identified plurality of potential signers 1006.

Next, the user device may receive one or more signed versions of the user certificate ($\text{Sig}_{Priv-S}(\text{Cert})$) from at least some of the plurality of potential signers 1008. A signed version of the user certificate Cert may have been signed with a signer private key (Priv-S) associated with a potential signer that received the user certificate. Once the signed versions of the user certificate have been received, the user device may assign/obtain an interface-specific and/or signer-specific weight Ws to each received signed version of the certificate $\text{Sig}_{Priv-S}(\text{Cert})_{S=1\ldots i}$, the signer weight Ws corresponding to each received signed version of the user certificate 1010. An interface-specific weight may correspond to a relationship between a user and a signer. In various examples the signer weight (e.g., user-assigned signer weight) for each signer may be proportional to: (a) a trust relationship between the user and the signer, and/or (b) a relationship distance between the user and the signer within a social network. A signer-specific weight may be associated with the specific signer rather than a particular relationship between the user (target) and the signer. A signer-specific weight may be generated by at least one of a community of users or a trusted third party.

The user device may then combine the user certificate, the received one or more signed versions of the user certificate, the identity of at least those signers of the received one or more signed versions of the user certificate, and/or the signer weights into a composite certificate 1012.

Next, the user device may generate a user signature by signing, all or part of the composite certificate 1014. In one example, the user signature may be over the received signed versions of the user certificate, the public key for said signers, and/or the user-assigned signer weights Ws weighs (e.g., $\text{Sig}_{Priv\text{-}U}(\text{Sig}_{Priv\text{-}S}(\text{Cert})_{S=1\ldots i}, \text{Pub-S}, W_S)$ using the user private key (Priv-U).

The user device may then distribute the composite certificate (e.g., user certificate, user signature $\text{Sig}_{Priv\text{-}U}(\text{Sig}_{Priv\text{-}S}(\text{Cert})_{S=1\ldots i}, \text{Pub-S}, W_S)$, the one or more signed versions of the user certificate $\text{Sig}_{Priv\text{-}S}(\text{Cert})_{S=1\ldots i}$, and/or user-assigned signer weights Ws (and possibly other parameters)) to one or more recipients 1016.

Exemplary Signer Device and Operations Therein

Figure 11:
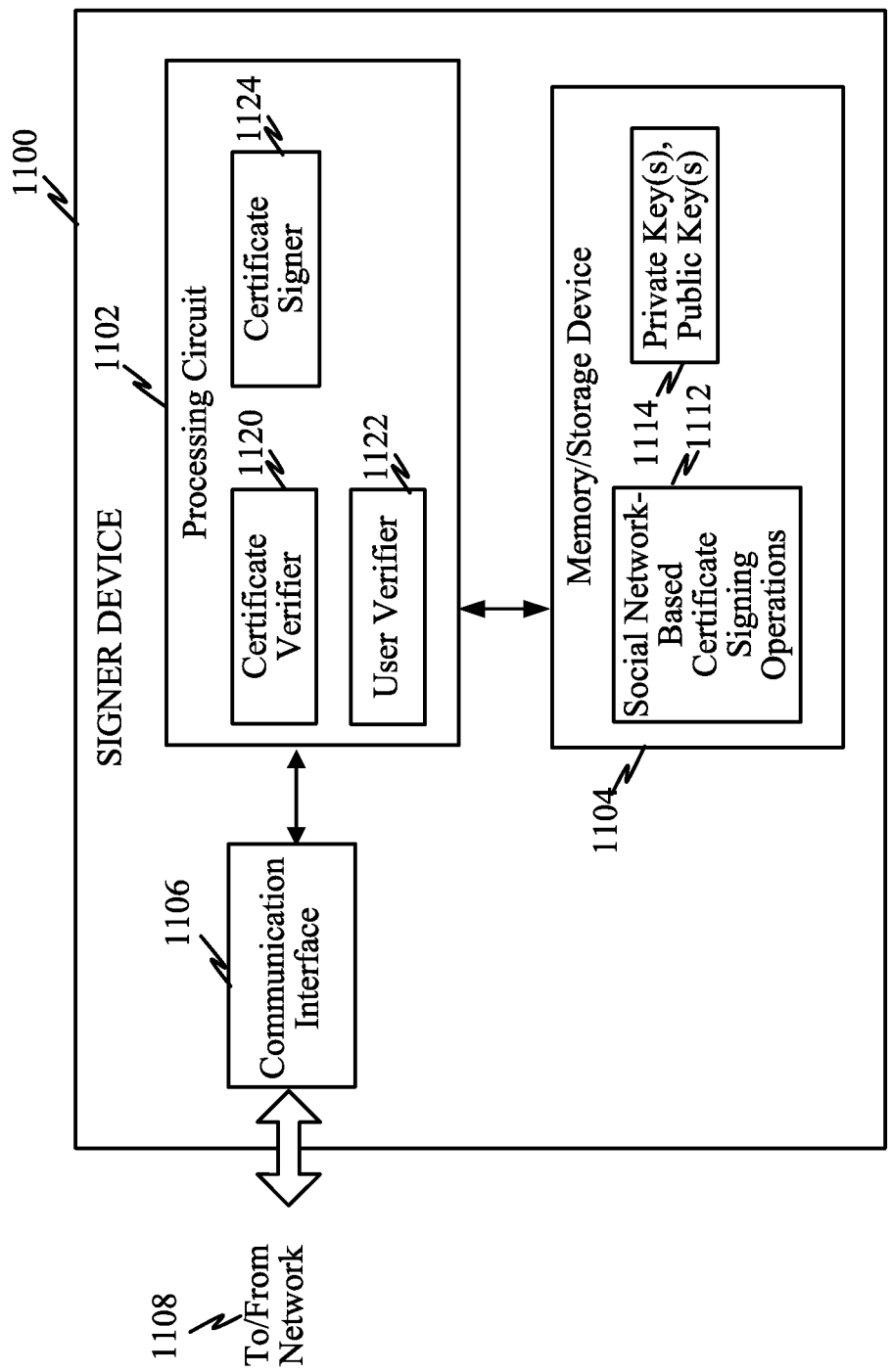
FIG. 11 illustrates a block diagram of an internal structure of a signer device 1100 according to one example.

FIG. 11 illustrates a block diagram of an internal structure of a signer device 1100 according to one example. The signer device 1100 (e.g., a validating user and/or device) may include a processing circuit (e.g., processor, processing module, etc) 1102 coupled to a memory/storage device 1104, and a communication interface 1106. The communication interface 1106 (e.g., including a transmitter circuit and/or receiver circuit) may be adapted to communicatively couple the signer device 1100 to a wireless communication network 1108, e.g., allowing the signer device 1100 to become part of and/or communicate with other devices within a social network and/or an online community. The memory/storage device 1104 may include one or more operations (instructions) for signing a received user certificate 1112, and sending the signed user certificate back to the user, where the signed user certificate ultimately becomes part of a social network-based certificate for the user.

The processing circuit 1102 may implement the operations stored in the memory/storage device 1104 to:
(a) obtain Signer Public Key (Pub-S) and corresponding signer Private Key (Priv-S);
(b) receive user Certificate (Cert) from a User;
(c) sign the user Cert with signer private key: Priv-S=$\text{Sig}_{Priv\text{-}S}$(Cert); and/or
(d) send a signed version of the user certificate ($\text{Sig}_{Priv\text{-}S}$(Cert)) and (potentially) Pub-S or Signer Identifier to the User.

According to another example, the processing circuit 1102 may include a certificate verifier 1120 adapted to verify/authenticate a received user certificate, a user verifier 1122 adapted to verify that the user of the received user certificate is known to the signer device 1100 (e.g., either through a direct or indirect social link), and/or a certificate signer 1124 adapted to sign the received user certificate. These circuits alone or in combination with other circuits of the processing circuit 1102 and/or the information available from the memory/storage device 1104 may perform the functions and/or steps to assist in the generation of a social network based trust metric for the user.

Figure 12:
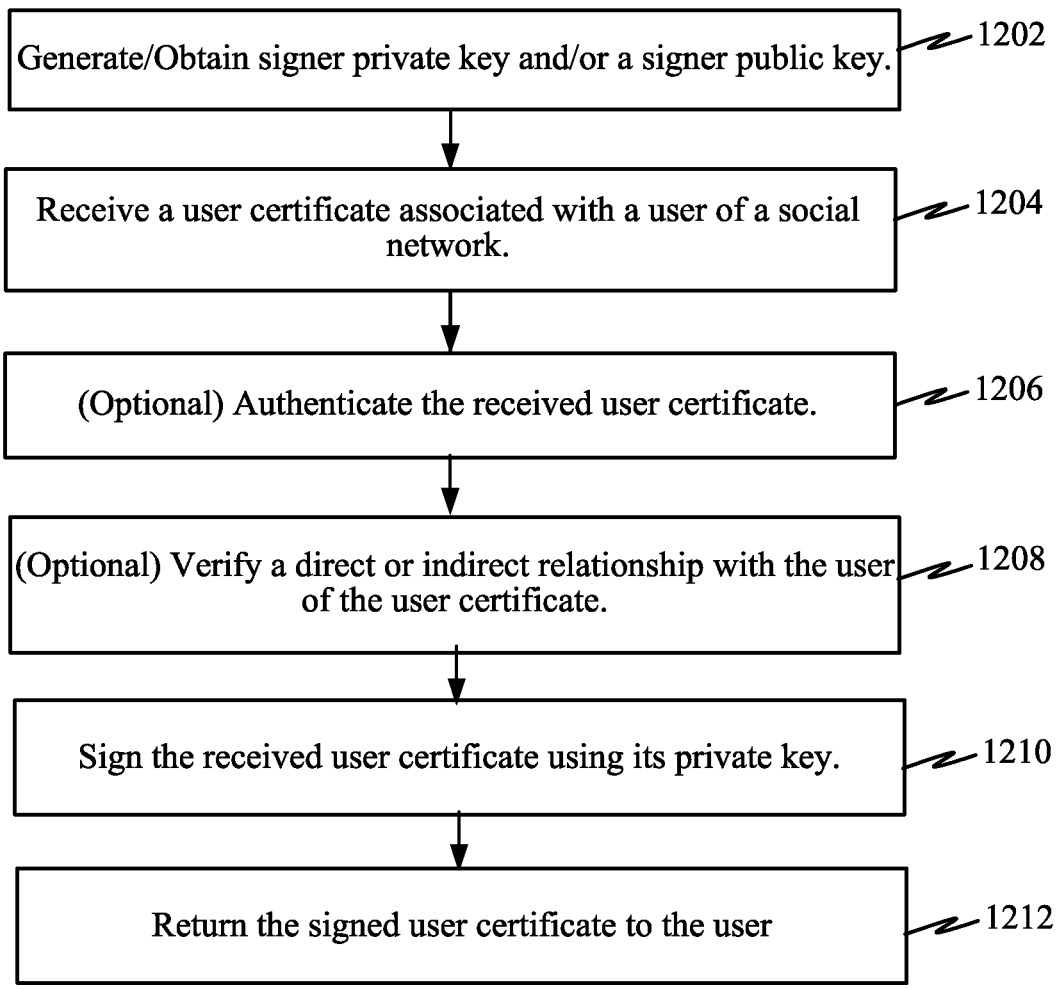
FIG. 12 illustrates an example of the operation of the signer device to facilitate generation a social network based user certificate.

FIG. 12 illustrates an example of the operation of the signer device to facilitate generation a social network based user certificate. The recipient device may generate or obtain a signer private key (Priv-S) and a corresponding signer public key (Pub-S) 1202. The recipient device may also receive a user certificate associated with a user of a social network 1204. The recipient device may (optionally) authenticate the user certificate 1206 and/or verify a direct or indirect relationship with the user of the user certificate 1208. If such authentication and/or verification are successful, the signer device may sign the received user certificate 1210 using its private key (Priv-S) and returns the signed user certificate to the user 1212.

Exemplary Recipient Device and Operations Therein

Figure 13:
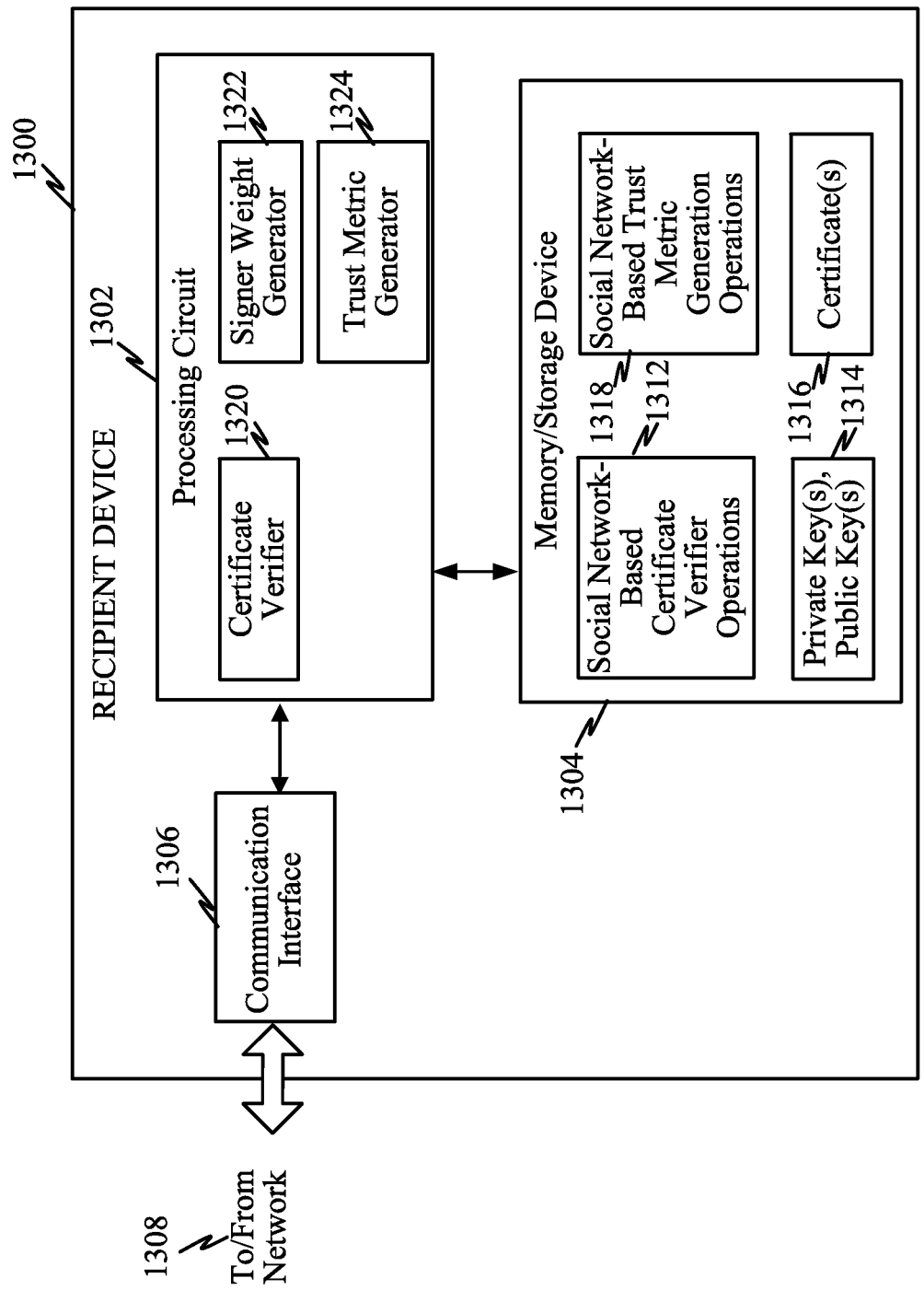
FIG. 13 illustrates a block diagram of an internal structure of a recipient device 1300 according to one example.

FIG. 13 illustrates a block diagram of an internal structure of a recipient device 1300 according to one example. The recipient device 1300 (e.g., a validating user and/or device) may include a processing circuit (e.g., processor, processing module, etc) 1302 coupled to a memory/storage device 1304, and a communication interface 1306. The recipient communication interface 1306 (e.g., including a transmitter circuit and/or a receiver circuit) may be adapted to communicatively couple the recipient device 1300 to a wireless communication network 1308, e.g., allowing the recipient device 1300 to become part of and/or communicate with other devices within a social network and/or an online community. The memory/storage device 1304 may include one or more operations (instructions) for verifying social network-based certificates 1312, generating a social network based trust metric 1318, storing one or more public and/or private keys 1314 and one or more certificates 1316.

The processing circuit 1302 may implement the operations stored in the memory/storage device 1304 to:
(a) obtain public keys Pub-U and Pub-S (e.g., associated with other users within a social network);
(b) receive a composite certificate and a user signature (e.g., over the composite certificate including a user certificate for a first user but signed by other users);
(c) verify/authenticate the user signature $\text{Sig}_{Priv\text{-}U}(\text{Sig}_{Priv\text{-}S}(\text{Cert})_{S=1\ldots i}, \text{Pub-S}, W_S)$;
(d) verify/authenticate signed versions of user certificate $\text{Sig}_{Priv\text{-}S}(\text{Cert})_{S=1\ldots i}$;
(e) possibly assign weights $W_R$ to the signers of the user certificate; and/or
(f) generate a trust metric to the user based (at least partially) on user-assigned signer weights $W_S$ and/or recipient-assigned signer weight $W_R$.

According to another example, the processing circuit 1302 may include a certificate verifier 1320 adapted to verify a user certificate and/or a composite certificate (e.g., based on social network contributions), a signer weight generator 1322 adapted to assign weights to those signers that contributed signed user certificates to the for the composite certificate, and/or a trust metric generator 1324 that generates a trust metric for a first user based on user weights assigned by the first user in its composite user certificate and/or user weights assigned by the recipient device. These circuits alone or in combination with other circuits of the processing circuit 1302 and/or the information available from the memory/storage device 1304 may perform the functions and/or steps to generate a social network based trust metric for the first user.

Figure 14:
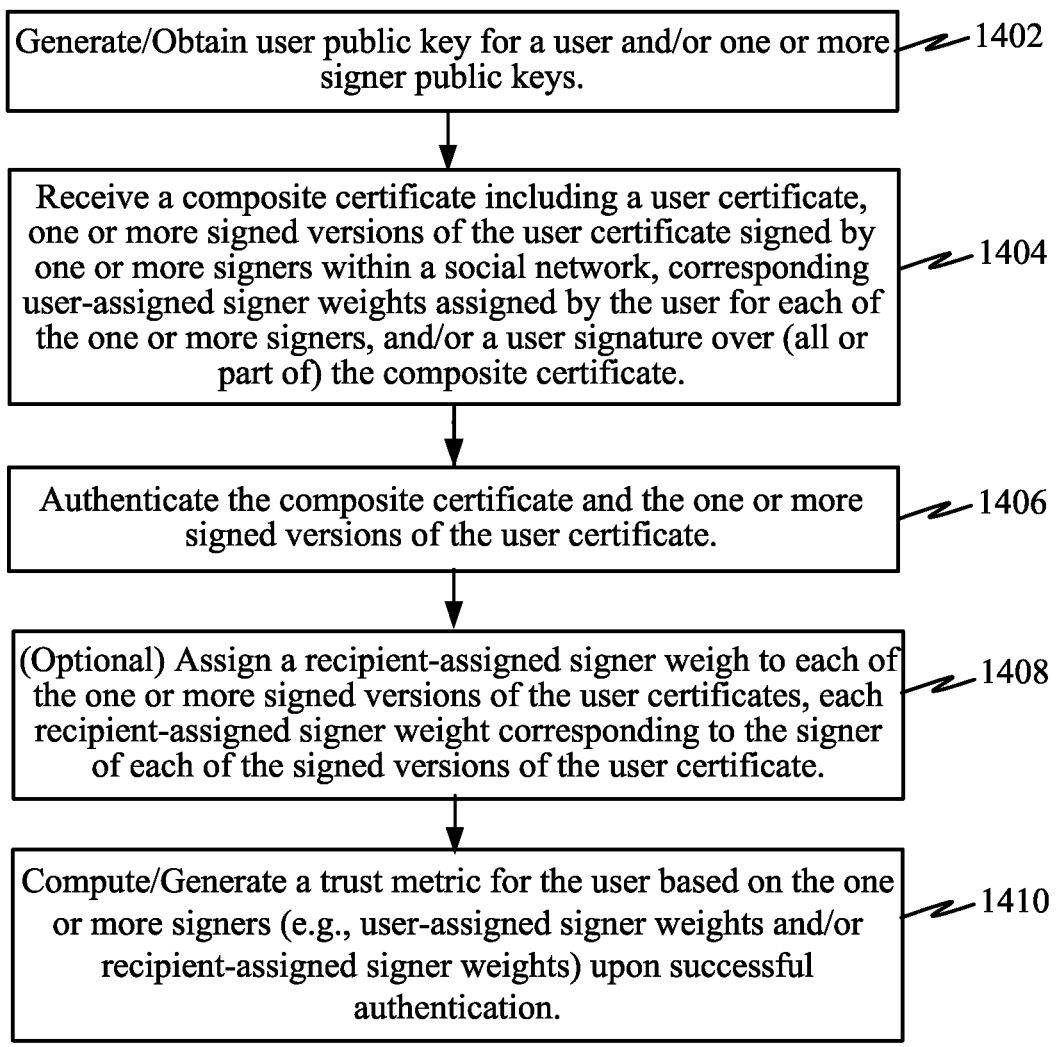
FIG. 14 illustrates an example of the operation of the recipient device to generate a social network based trust metric for a user.

FIG. 14 illustrates an example of the operation of the recipient device to generate a social network based trust metric for a user. The recipient device may generate or obtain a user public key (Pub-U) and a signer public key (Pub-S) 1402. Next, the recipient device may receive a composite certificate, including a user certificate (Cert), one or more signed versions of the user certificate signed by one or more signers $\text{Sig}_{Priv\text{-}S}(\text{Cert})_{S=1\ldots i}$ within a social network, corresponding user-assigned signer weights Ws assigned by the user, and/or a user signature over (all or part of) the composite certificate 1404. For instance, the user signature $\text{Sig}_{Priv\text{-}U}(\text{Sig}_{Priv\text{-}S}(\text{Cert})_{S=1\ldots i})$ may include one or more signed versions of the user certificate ($\text{Sig}_{Priv\text{-}S}(\text{Cert})_{S=1\ldots i}$). The recipient device may then authenticate the composite certificate and the one or more signed versions of the user certificate 1406. For instance, the composite certificate may be authenticated based on the user signature $\text{Sig}_{Priv-U}(\text{Sig}_{Priv-S}(\text{Cert})_{S=1\ldots i})$ using the user public key. The one or more signed versions of the user certificate $\text{Sig}_{Priv-S}(\text{Cert})_{S=1\ldots i}$ may be similarly authenticated using a corresponding signer public key.

Optionally, the recipient device may assign a recipient weight to each signed version of the user certificate, the recipient-assigned signer weight corresponding to the signer of each signed version of the user certificate 1408. If authentication is successful, a trust metric may be computed for the user based on the one or more signers (e.g., user-assigned signer weights and/or recipient-assigned signer weights) 1410.

Key Signing

A given user certificate may be signed by any number of other users (signers) that constitute the social graph of that user. Note that in this system, the user certificate is used as a vehicle to obtain or collect signatures from other users (signers) within a social network and be able to use such signatures, along with corresponding weights for the other users (signers), to generate a trust metric for the user. Consequently, the certificate itself may be anything that is uniquely associated with the user. For instance, in one example, the certificate may be the user's public key which may be signed by the other users (signers) (e.g., the public key is being used as the user certificate). In this sense, the signing of a user's public key is similar to the Pretty Good Protection (PGP) system.

In a practical system, the number of levels removed a signer may be from the user may be limited by the size and/or structure of a social graph and may serve (at least partially) in assigning a weight for the signer relative to the user.

A weight corresponding to the link between the user and the signer (other users) may be assigned to the signature. For example, a higher weight may be assigned to a signer if the user is directly linked to that signer. A correspondingly lower weight may be assigned to a different signer if the user is only indirectly linked to that different signer. These assigned weights may be dynamically adjusted over time (e.g., time-varying weights) as the interaction between two users increases or decreases (e.g., corresponding to changing social graph node positions).

Furthermore, different weights may be applied to different signers based on the purpose of the key (e.g., purpose-dependent weight). Additionally, different weights may be applied to the same signer based on the purpose for which the key is being used. The process of key signing may be initiated by the user, for example in order to use secure communication or allow privacy sensitive information sharing. The prompts/requests for signatures may be automated by the system using the weighted social graph or the user may be asked to pick the other users in the social graph based on preferences.

Purpose-Specific Public Keys

According to one aspect, a user may have a plurality of different purpose-specific (e.g., purpose-dependent) public keys. In one example, Alice may have multiple public keys that correspond to her work and social identities. The signing for such cases may be handled by the creation of a domain-specific interaction graph, such as a work-specific graph and a social graph in the true sense of the term. Alternatively, the signing may be handled by weighting the nodes (signers) related to the particular purpose of the key higher than the other nodes (signers). For example, Alice's work identity may weigh the signatures from her colleagues (signers) higher than that of her friends. The weights may be dynamically adjusted based on ongoing interactions and the intersection of the various domain specific nodes or graphs, i.e., it may make sense to weight a signature of a particular node (signer) lower if it belongs to someone that Alice knows at work, but also interacts with socially.

Recipient Based Weighting and a Trust Metric

Given that this system is not based on a global PKI that is universally trusted, the trust level may be a complex combination of the signers and the recipient(s). That is, for example, a recipient may trust a signature on a target user's certificate from a first signer more than one from a second signer if the recipient trusts first signer more. On the other hand, the second signer may know the target user more/better. In one aspect, for a recipient to compute a trust metric, two sets of weights may be utilized (i.e., user-assigned signer weights and recipient assigned signer weights). A key owner weight (also referred to as user-assigned assigner weight) and key recipient weight (also referred to as recipient-assigned signer weight) may be available to apply against a given certificate signer (i.e., signer of version of user certificate). The recipient may apply the recipient-assigned signer weight independent of, or in conjunction with, the user-assigned signer weight in order to compute a trust metric for the user.

APPLICABILITY

In addition to facilitating basic authentication and encryption on social networks in a significantly simplified fashion, this mechanism allows an estimate of a trust metric in completely unknown settings. For example, a potential employer looking at a profile on Linkedin® may apply higher weights to signers that are employed by them or trusted by them as domain experts in the field. Such applications may open up the possibilities of trust metrics in electronic interactions that are normally only feasible in human interactions. The weights may be designed as tunable parameters that can be specified by the end user of the system or applications to dynamically derive trust metrics that are useful for them.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a user device for generating a social graph based certificate, comprising:
    obtaining a user certificate for a user of the user device, wherein the user is associated with a user public key and corresponding user private key;
    identifying a plurality of potential signers within one or more social networks;
    sending the user certificate from the user device to the plurality of potential signers;
    receiving, at the user device, one or more signed versions of the user certificate from at least some of the plurality of potential signers;
    assigning a signer weight for each of the one or more signed versions of the user certificate, each corresponding signer weight associated with the signer of each signed version of the user certificate; and
    combining the user certificate, the one or more signed versions of the user certificate, the assigned signer weight for each of the one or more signed versions of the user certificate, and the identity of at least those signers of the one or more signed versions of the user certificate into a composite certificate.

2. The method of claim 1, further comprising:
    generating a user signature by signing at least part of the composite certificate using the user private key; and
    appending the user signature to the composite certificate.

3. The method of claim 2, wherein generating the user signature includes one of either:
    signing the user certificate, including identities of the identified plurality of potential signers, using the user private key; or
    signing the user certificate, including the received one or more signed versions of the user certificate, using the user private key.

4. The method of claim 3, wherein the corresponding signer weights are also signed using the user private key to generate the user signature.

5. The method of claim 1, wherein the plurality of potential signers is identified from contacts derived from emails or an address book for the user.

6. The method of claim 1, further comprising:
    sending identities of the identified plurality of potential signers, along with the user certificate, from the user device to the plurality of potential signers for signing by one or more of the potential signers.

7. The method of claim 1, wherein the user certificate includes the user public key.

8. The method of claim 1, wherein a first signed version of the user certificate, from among the one or more signed versions of the user certificate, is signed by a signer using a second private key and is authenticatable using a corresponding second public key.

9. The method of claim 1, further comprising:
distributing the user certificate, a user signature, the one or more signed versions of the user certificate, and the one or more assigned signer weights to one or more recipients of the composite certificate.

10. The method of claim 1, further comprising:
appending a user certificate timestamp or lifetime indicator to the user certificate at the user device prior to distribution to one or more recipients.

11. The method of claim 1, further comprising:
adding the user-assigned signer weight for each signed version of the user certificate to the composite certificate.

12. The method of claim 11, wherein the assigned signer weight for each signer is proportional to a trust relationship between the user and the signer.

13. The method of claim 11, wherein the assigned signer weight for each signer is proportional to a relationship distance between the user and the signer within a social network.

14. The method of claim 11, wherein the assigned weight for each signer is at least one of: a time-varying weight or a purpose-dependent weight.

15. The method of claim 11, wherein the assigned weight for each signer is at least partially based on weights received from other users and which are authenticable by the user device.

16. The method of claim 11, wherein for signers known to the user of the assigned signer weight is solely determined by the user, while for signers unknown to the user the assigned signer weight is at least partially based on weights provided by known signers for such unknown signers.

17. The method of claim 1, further comprising:
obtaining a signer-specific weight for each signed version of the user certificate; and
adding the signer-specific weight for each signed version of the user certificate to the composite certificate.

18. The method of claim 17, wherein each signer-specific weight is associated with a corresponding signer.

19. The method of claim 17, wherein the signer-specific weight is generated by at least one of a community of users or a trusted third party.

20. A user device comprising:
a communication interface for communicating over a communication network;
a processing circuit coupled to the communication interface, the processing circuit configured to:
obtain a user certificate for a user of the user device, wherein the user is associated with a user public key and corresponding user private key;
identify a plurality of potential signers within one or more social networks;
send the user certificate from the user device to the plurality of potential signers;
receive, at the user device, one or more signed versions of the user certificate from at least some of the plurality of potential signers;
assign a signer weight for each of the one or more signed versions of the user certificate, each corresponding signer weight associated with the signer of each signed version of the user certificate; and
combine the user certificate, the one or more signed versions of the user certificate, the assigned signer weight for each of the one or more signed versions of the user certificate, and the identity of at least those signers of the one or more signed versions of the user certificate into a composite certificate.

21. The user device of claim 20, wherein the processing circuit is further configured to:
generate a user signature by signing at least part of the composite certificate using the user private key; and
append the user signature to the composite certificate.

22. The user device of claim 21, wherein to generate the user signature, the processing circuit is further configured to either:
sign the user certificate, including identities of the identified plurality of potential signers, using the user private key; or
sign the user certificate, including the received one or more signed versions of the user certificate, using the user private key.

23. The user device of claim 22, wherein the corresponding signer weights are also signed using the user private key to generate the user signature.

24. The user device of claim 20, wherein the processing circuit is further configured to:
send identities of the identified plurality of potential signers, along with the user certificate, from the user device to the plurality of potential signers for signing by one or more of the potential signers.

25. A user device comprising:
means for obtaining a user certificate for a user of the user device, wherein the user is associated with a user public key and corresponding user private key;
means for identifying a plurality of potential signers within one or more social networks;
means for sending the user certificate from the user device to the plurality of potential signers;
means for receiving, at the user device, one or more signed versions of the user certificate from at least some of the plurality of potential signers;
means for assigning a signer weight for each of the one or more signed versions of the user certificate, each corresponding signer weight associated with the signer of each signed version of the user certificate; and
means for combining the user certificate, the one or more signed versions of the user certificate, the assigned signer weight for each of the one or more signed versions of the user certificate, and the identity of at least those signers of the one or more signed versions of the user certificate into a composite certificate.

26. The user device of claim 25, further comprising:
means for adding the assigned signer weight for each signed version of the user certificate to the composite certificate.

27. A non-transitory processor-readable medium having one or more instructions operational in a user device, which when executed by one or more processors causes the one or more processors to:
obtain a user certificate for a user of the user device, wherein the user is associated with a user public key and corresponding user private key;
identify a plurality of potential signers within one or more social networks;
send the user certificate from the user device to the plurality of potential signers;
receive, at the user device, one or more signed versions of the user certificate from at least some of the plurality of potential signers;
assign a signer weight for each of the one or more signed versions of the user certificate, each corresponding signer weight associated with the signer of each signed version of the user certificate; and combine the user certificate, the one or more signed versions of the user certificate, the assigned signer weight for each of the one or more signed versions of the user certificate, and the identity of at least those signers of the one or more signed versions of the user certificate into a composite certificate.

28. The non-transitory processor-readable medium of claim 27, further having one or more instructions operational in the user device, which when executed by one or more processors causes the one or more processors to:
add the user-assigned signer weight for each signed version of the user certificate to the composite certificate.

29. A method operational on a recipient device for generating a trust metric for a user, comprising:
receiving, at the recipient device, a composite certificate including a user certificate, one or more signed versions of the user certificate signed by one or more signers within a social network, a signer weight assigned by the user for each of the one or more signed versions of the user certificate, and a user signature over the composite certificate;
authenticating the composite certificate and the one or more signed versions of the user certificate;
assigning a recipient-assigned signer weight to each of the one or more signed versions of the user certificate, each recipient-assigned signer weight corresponding to the signer of each of the signed versions of the user certificate; and
generating, upon successful authentication of the one or more signers, a trust metric for the user based on a combination of the signer weight assigned by the user for each of the one or more signed versions of the user certificate and recipient-assigned signer weights.

30. The method of claim 29, wherein the user certificate is a user public key.

31. The method of claim 29, further comprising:
generating a trust metric for the user based on the one or more recipient-assigned signer weights.

32. The method of claim 29, wherein authenticating the user certificate includes
applying a user public key to the user signature to verify the authenticity of the signed content within the composite certificate.

33. The method of claim 29, wherein authenticating the one or more signed versions of the user certificate includes
applying a signer public key to the one or more signed versions of the user certificate to verify their authenticity.

34. The method of claim 29, wherein the one or more signed versions of the user certificate are signed by a party other than the user.

35. A recipient device comprising:
a communication interface for communicating over a communication network;
a processing circuit coupled to the communication interface, the processing circuit configured to:
receive, at the recipient device, a composite certificate including a user certificate, one or more signed versions of the user certificate signed by one or more signers within a social network, a signer weight assigned by a user for each of the one or more signed versions of the user certificate, and a user signature over the composite certificate;
authenticate the composite certificate and the one or more signed versions of the user certificate;
assign a recipient-assigned signer weight to each of the one or more signed versions of the user certificate, each recipient-assigned signer weight corresponding to the signer of each of the signed versions of the user certificate; and
generate, upon successful authentication of the one or more signers, a trust metric for the user based on a combination of the signer weight assigned by the user for each of the one or more signed versions of the user certificate and recipient-assigned signer weights.

36. The recipient device of claim 35, wherein the user certificate is the user public key.

37. A recipient device comprising:
means for receiving a composite certificate including a user certificate, one or more signed versions of the user certificate signed by one or more signers within a social network, a signer weight assigned by a user for each of the one or more signed versions of the user certificate, and a user signature over the composite certificate;
means for authenticating the user certificate and the one or more signed versions of the user certificate;
means for assigning a recipient-assigned signer weight to each of the one or more signed versions of the user certificate, each recipient-assigned signer weight corresponding to the signer of each of the signed versions of the user certificate; and
means for generating, upon successful authentication of the one or more signers, a trust metric for the user based on a combination of the signer weight assigned by the user for each of the one or more signed versions of the user certificate and recipient-assigned signer weights.

38. A non-transitory processor-readable medium having one or more instructions operational in a recipient device, which when executed by one or more processors causes the one or more processors to:
receive, at the recipient device, a composite certificate including a user certificate, one or more signed versions of the user certificate signed by one or more signers within a social network, a signer weight assigned by a user for each of the one or more signed versions of the user certificate, and a user signature over the composite certificate;
authenticate the composite certificate and the one or more signed versions of the user certificate;
assign a recipient-assigned signer weight to each of the one or more signed versions of the user certificate, each recipient-assigned signer weight corresponding to the signer of each of the signed versions of the user certificate; and
generate, upon successful authentication of the one or more signers, a trust metric for the user based on a combination of the signer weight assigned by the user for each of the one or more signed versions of the user certificate and recipient-assigned signer weights.

\* \* \* \* \*